US009720776B2

(12) United States Patent
Takahashi

(10) Patent No.: US 9,720,776 B2
(45) Date of Patent: Aug. 1, 2017

(54) SERVER SYSTEM, METHOD FOR CONTROLLING THE SAME, AND PROGRAM FOR EXECUTING PARALLEL DISTRIBUTED PROCESSING

(71) Applicant: CANON KABUSHIKI KAISHA, Tokyo (JP)

(72) Inventor: Takeshi Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 14/231,037

(22) Filed: Mar. 31, 2014

(65) Prior Publication Data
US 2014/0325517 A1    Oct. 30, 2014

(30) Foreign Application Priority Data
Apr. 2, 2013 (JP) ................................ 2013-077128

(51) Int. Cl.
*G06F 9/455* (2006.01)
*G06F 9/44* (2006.01)
(Continued)

(52) U.S. Cl.
CPC .......... *G06F 11/1438* (2013.01); *G06F 9/485* (2013.01); *G06F 9/5077* (2013.01);
(Continued)

(58) Field of Classification Search
CPC .... G06F 2209/503; G06F 9/465; G06F 9/505; G06F 9/524; G06F 9/4881; G06F 9/5033;
(Continued)

(56) References Cited

U.S. PATENT DOCUMENTS 5,555,100 A * 9/1996 Bloomfield ........ H04N 1/00029
358/402
6,243,778 B1 * 6/2001 Fung ................. H04L 12/40117
370/462

(Continued)

FOREIGN PATENT DOCUMENTS

JP       2000-347759 A       12/2000
JP       2011-095835 A        5/2011
JP       2011-170804 A        9/2011

OTHER PUBLICATIONS

SanThanam Srinivasan et al., Safety and Reliability Driven Task Allocation in Distributed Systems, IEEE Mar. 1999, [Retrieved on Jul. 12, 2016]. Retrieved from the internet: <URL: http://ieeexplore.ieee.org/stamp/stamp.jsp?tp=&arnumber=755824> 14 Pages (238-251).*

(Continued)

Primary Examiner — Thuy Dao
Assistant Examiner — Anibal Rivera
(74) Attorney, Agent, or Firm — Canon USA, Inc. IP Division

(57) ABSTRACT

If the number of task attempts has not exceeded the maximum number of attempts, a server system transmits a regular job to cause tasks to execute a particular process, and if the number of task attempts has exceeded the maximum number of attempts, the server system transmits a failed job to cause the tasks to execute post-processing corresponding to the particular process.

13 Claims, 29 Drawing Sheets

(51) Int. Cl.
*G06F 11/14* (2006.01)
*G06F 9/48* (2006.01)
*G06F 9/50* (2006.01)
G06F 11/30 (2006.01)
G06F 11/32 (2006.01)
G06F 17/30 (2006.01)

(52) U.S. Cl.
CPC ...... *G06F 11/3006* (2013.01); *G06F 11/3055* (2013.01); *G06F 11/327* (2013.01); *G06F 17/30873* (2013.01)

(58) Field of Classification Search
CPC .... G06F 9/5044; G06F 11/07; G06F 11/1402; G06F 3/1203; G06F 11/0751; G06F 8/30; G06F 8/61; G06F 9/5077; G06F 9/5072; G06F 9/45512; G06F 9/485; G06F 9/5027; G06F 9/546; G06F 9/5038; G06F 17/30873; G06F 17/2258; H04N 1/32619
See application file for complete search history.

(56) References Cited

U.S. PATENT DOCUMENTS

| | | | | |
|---|---|---|---|---|
| 6,389,248 B1* | 5/2002 | Konno | ............... | H04N 1/00915 399/81 |
| 6,549,951 B1* | 4/2003 | Hui | ............... | G06F 13/385 709/250 |
| 7,266,821 B2* | 9/2007 | Polizzi | ............... | G06F 17/30873 707/E17.111 |
| 7,386,586 B1* | 6/2008 | Headley | ............... | G06F 9/5033 709/201 |
| 8,065,680 B2* | 11/2011 | Parvathaneni | ............... | G06F 9/5033 709/201 |
| 8,108,878 B1* | 1/2012 | Pulsipher | ............... | G06F 9/524 718/100 |
| 8,281,309 B2* | 10/2012 | Meda | ............... | G06F 11/1402 718/101 |
| 8,687,208 B2* | 4/2014 | Nakatsuka | ............... | G06F 3/1219 358/1.1 |
| 2002/0049873 A1* | 4/2002 | Mikuni | ............... | H04N 1/00281 710/73 |
| 2002/0194245 A1* | 12/2002 | Simpson | ............... | G06F 9/5027 718/101 |
| 2003/0145103 A1* | 7/2003 | Pruyne | ............... | H04L 29/06 709/237 |
| 2003/0154284 A1* | 8/2003 | Bernardin | ............... | G06F 9/465 709/226 |
| 2003/0191795 A1* | 10/2003 | Bernardin | ............... | G06F 9/505 718/105 |
| 2003/0200266 A1* | 10/2003 | Henry | ............... | H04L 29/06 709/206 |
| 2004/0194010 A1* | 9/2004 | Kirihara | ............... | G06F 17/2258 715/255 |
| 2005/0071495 A1* | 3/2005 | Kadota | ............... | G03G 15/55 709/232 |
| 2005/0154782 A1* | 7/2005 | Yoshida | ............... | H04N 1/32117 709/206 |
| 2007/0164927 A1* | 7/2007 | Shoya | ............... | G06F 3/147 345/30 |
| 2008/0007791 A1* | 1/2008 | Nagarajan | ............... | H04N 1/32619 358/402 |
| 2009/0083746 A1* | 3/2009 | Katsumata | ............... | G06F 9/485 718/103 |
| 2009/0222826 A1* | 9/2009 | Johnson | ............... | G06F 8/61 718/102 |
| 2010/0217959 A1* | 8/2010 | Ishikawa | ............... | G06F 12/126 712/216 |
| 2010/0241833 A1* | 9/2010 | Suzue | ............... | G06F 9/5038 712/220 |
| 2011/0205585 A1* | 8/2011 | Mihara | ............... | G06F 3/1203 358/1.15 |
| 2011/0205586 A1* | 8/2011 | Takahashi | ............... | G06F 9/5027 358/1.15 |
| 2011/0258628 A1* | 10/2011 | Devadhar | ............... | G06F 9/546 718/100 |
| 2012/0167099 A1* | 6/2012 | Kajita | ............... | G06F 9/45512 718/101 |
| 2013/0047135 A1* | 2/2013 | Joshi | ............... | G06F 8/30 717/120 |
| 2013/0055036 A1* | 2/2013 | Fujisawa | ............... | H04N 1/00222 714/48 |
| 2013/0103977 A1* | 4/2013 | Zimmermann | ..... | G06F 11/0751 714/4.11 |
| 2013/0125134 A1* | 5/2013 | Ota | ............... | G06F 3/12 718/106 |
| 2013/0179881 A1* | 7/2013 | Calder | ............... | G06F 9/5072 718/1 |
| 2013/0179894 A1* | 7/2013 | Calder | ............... | G06F 9/5027 718/104 |
| 2013/0179895 A1* | 7/2013 | Calder | ............... | G06F 9/5077 718/104 |
| 2014/0195585 A1* | 7/2014 | Mihara | ............... | H04L 67/10 709/201 |

OTHER PUBLICATIONS

Jeffrey Dean et al., MapReduce: Simplified Data Processing on Large Clusters, 2004, [Retrieved on Jul. 12, 2016]. Retrieved from the internet: <URL: http://static.googleusercontent.com/media/research.google.com/en//archive/mapreduce-osdi04.pdf> 13 Pages (1-13).*

* cited by examiner

FIG.7

| USER ID | TICKET ID | ROUTE ID | PARAMETERS |
|---|---|---|---|
| user1 | 00001 | 001 | Width:100,Height;200,FolderPath:¥User¥user1¥ |
| user2 | 00002 | 002 | Uri:http://cloud1service1/document/ accessToken:abcdefghijklmnxxxxxxxxxxxx, expires_in:2011/12/31 12:00:00 |
| user1 | 00003 | 003 | |
| user3 | 00004 | 002 | Uri:http://cloud1service2/document/ accessToken:opqrstuvwxxxxxxxxxxxxx, expires_in:2011/1/1 12:00:00 |
| user4 | 00005 | 003 | |
| user5 | 00006 | 003 | |

FIG.8

| TEMPLATE ID | TEMPLATE NAME | ROUTE ID |
|---|---|---|
| 01 | SCAN TO CLOUD 1 | 001 |
| 02 | SCAN TO CLOUD 2 | 002 |
| 03 | JPEG TO CLOUD 1 | 003 |

⋮

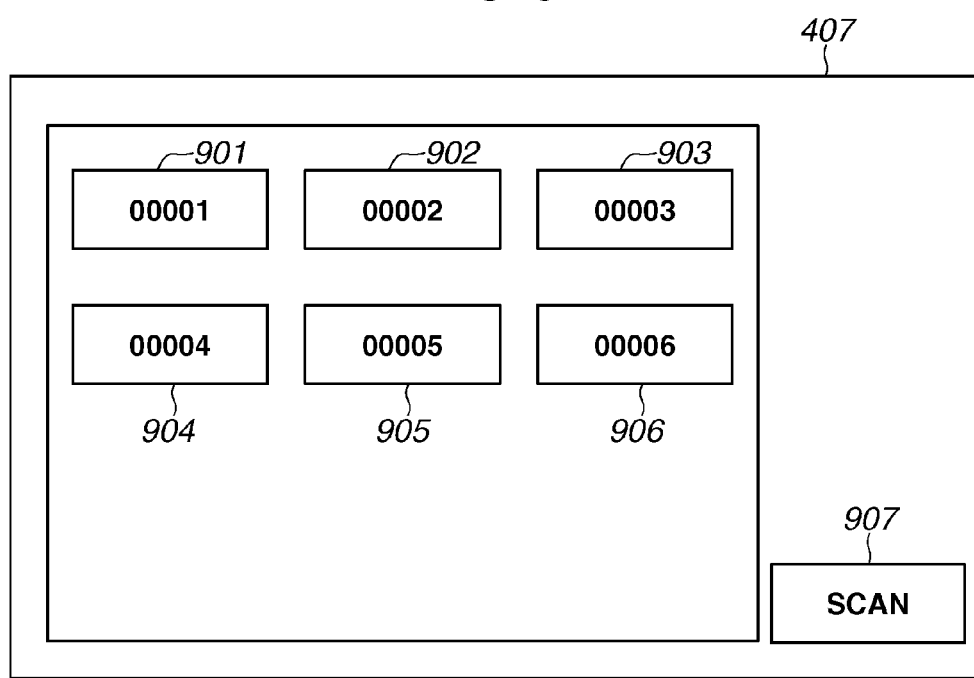

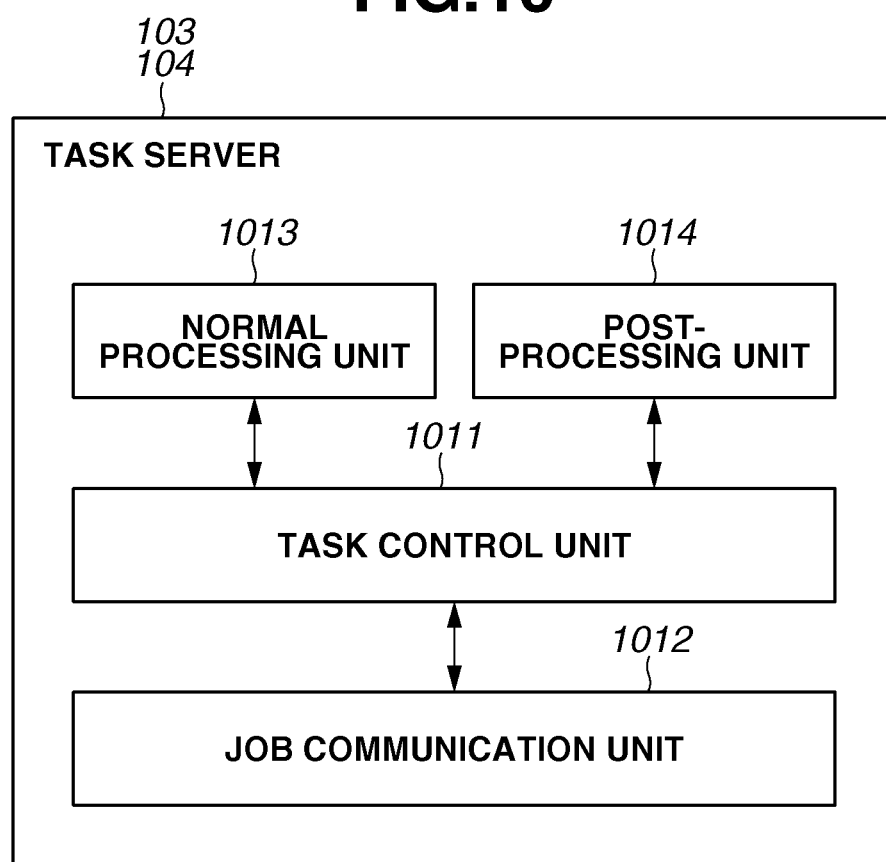

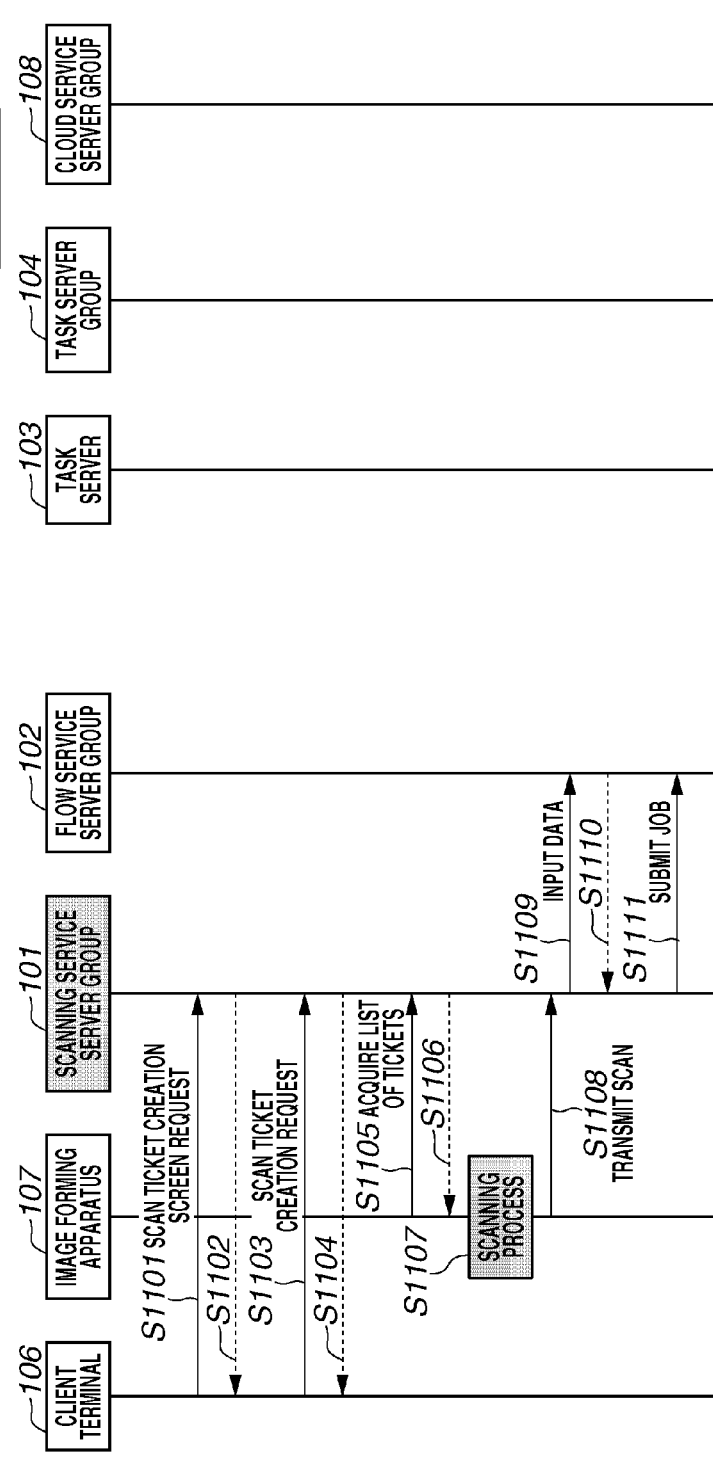

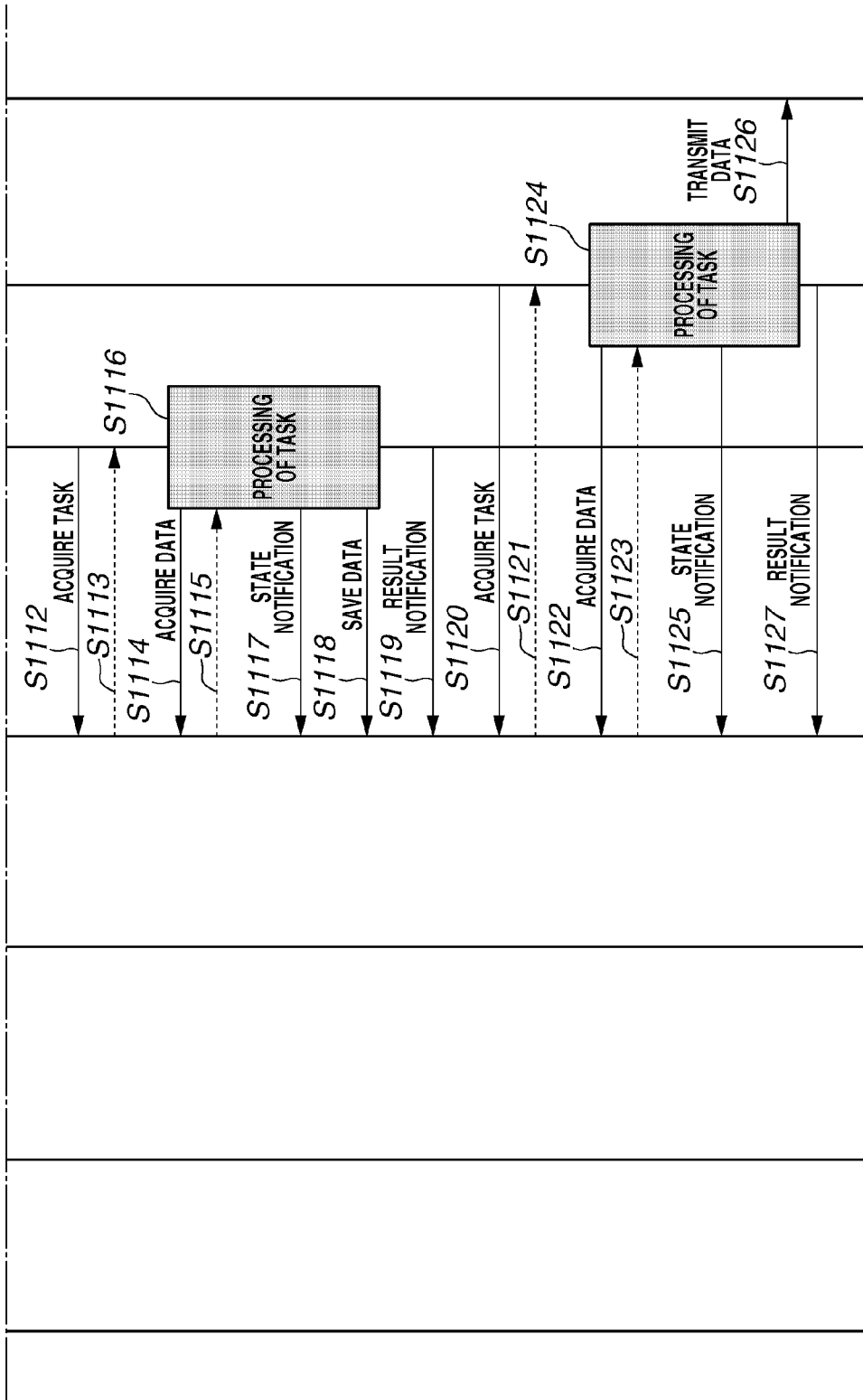

FIG.14

| ROUTE ID | SEQUENCE NUMBER | TASK ID | MAXIMUM NUMBER OF RETRIES | |
|---|---|---|---|---|
| 001 | 1 | TASK 9 | 3 | ~1411 |
| 001 | 2 | TASK 2 | 3 | ~1412 |
| 002 | 1 | TASK 1 | 3 | ~1413 |
| 002 | 2 | TASK 3 | 3 | ~1414 |
| 002 | 3 | TASK 5 | 5 | ~1415 |
| 002 | 4 | TASK 7 | 1 | ~1416 |
| 003 | 1 | TASK 2 | 3 | ~1417 |

Columns: 1401, 1402, 1403, 1404

FIG.15

| TASK ID | TASK NAME | CESSATION TIME | STATE NOTIFICATION TIME |
|---------|-----------|----------------|-------------------------|
| TASK 1 | PDF-TO-PDL CONVERSION | 610 | 60 |
| TASK 2 | SAVE IN CLOUD 1 | 40 | 30 |
| TASK 3 | DATA CONVERSION SERVICE COOPERATION | 130 | 30 |
| TASK 4 | SAVE IN CLOUD 2 | 70 | 60 |
| TASK 5 | ACQUIRE DATA FROM CLOUD 1 | 310 | 30 |
| TASK 6 | PDF-TO-PEG CONVERSION | 1210 | 30 |
| TASK 7 | SAVE IN CLOUD 3 | 70 | 30 |
| TASK 8 | SAVE SCAN DATA | 40 | 30 |
| TASK 9 | IMAGE PROCESSING | 610 | 60 |

| JOB ID | ROUTE ID | FILE GROUP ID | CURRENT TASK ID | STATUS | LAST UPDATE TIME | PARAMETERS | TIME STAMP | LAST STATE NOTIFICATION TIME | NUMBER OF TASK RETRIES |
|---|---|---|---|---|---|---|---|---|---|
| 1 | 001 | FG1 | Task9 | 0 | 2011/09/15 12:00:00 | Width:100,Height:200,FolderPath:\User\user1\ | 6a3e232a-b93b-4816-ac94-99d1b29ef75f | 2011/09/15 12:00:30 | 0 |
| 2 | 002 | FG2 | Task1 | 0 | 2011/09/15 12:30:00 | Uri:http://cloudservice1/document/ accessToken:opqrstuvwxxxxxxxxxxxxxxx, expires_in:2011/12/31 12:00:00 | 1ca36a45-0a77-4a13-8aba-e8b9a7c6eaaa | 2011/09/15 12:30:30 | 0 |
| 3 | 003 | FG3 | Task2 | 1 | 2011/09/15 13:00:00 | | ec74a44b-36d3-45e0-91d4-ee42ee9a53b | 2011/09/15 13:00:30 | 1 |
| 4 | 002 | FG4 | Task5 | 2 | 2011/09/15 12:40:00 | Uri:http://cloudservice2/document/ accessToken:opqrstuvwxxxxxxxxxxxxxxx, expires_in:2011/1/1 12:00:00" | 6a2f6e4e-e0e5-4561-9055-3eedec166cc3 | 2011/09/15 12:40:30 | 5 |

| FILE GROUP ID | No | PATH | HOST NAME |
|---|---|---|---|
| FG 1 | 0 | \\ServerA\FG1\1.pdf | ServerA |
| FG 1 | 0 | \\ServerB\FG1\1.pdf | ServerB |
| FG 1 | 1 | \\ServerA\FG1\2\1.pdf | ServerA |
| FG 2 | 0 | \\ServerA\FG2\init\1.pdf | ServerA |
| FG 2 | 0 | \\ServerB\FG2\init\1.pdf | ServerB |
| FG 2 | 1 | \\ServerB\FG2\2\1.pdf | ServerB |

| ROUTE ID (2001) | MAXIMUM NUMBER OF JOB RETRIES (2002) |
|---|---|
| 001 | 3 |
| 002 | 1 |
| 003 | 3 |

| | 1701 | 1702 | 1703 | 1704 | 1705 | 1706 | 1707 | 1708 | 1709 | 1710 | 2101 |
|---|---|---|---|---|---|---|---|---|---|---|---|
| | JOB ID | ROUTE ID | FILE GROUP ID | CURRENT TASK ID | STATUS | LAST UPDATE TIME | PARAMETERS | TIME STAMP | LAST STATE NOTIFICATION TIME | NUMBER OF TASK RETRIES | NUMBER OF JOB RETRIES |
| | 1 | 001 | FG1 | Task9 | 0 | 2011/09/15 12:00:00 | Width:100,Height:200,FolderPath:\User\user1\ | 6a3e232a-b93b-4816-ac94-99d1b29ef75f | 2011/09/15 12:00:30 | 0 | 0 |
| | 2 | 002 | FG2 | Task1 | 0 | 2011/09/15 12:30:00 | Uri:http://cloudlservice1/document/ accessToken:opqrstuvwxxxxxxxxxxxxxxx, expires_in:2011/12/31 12:00:00 | 1ca36a45-0a77-4a13-8aba-e8b9a7c6eaaa | 2011/09/15 12:30:30 | 0 | 0 |
| | 3 | 003 | FG3 | Task2 | 1 | 2011/09/15 13:00:00 | | ec74a44b-36d3-45e0-91d4-ee4f2ee9a53b | 2011/09/15 13:00:30 | 1 | 1 |
| | 4 | 002 | FG4 | Task5 | 2 | 2011/09/15 12:40:00 | Uri:http://cloudlservice2/document/ accessToken:opqrstuvwxxxxxxxxxxxxxxx, expires_in:2011/1/1 12:00:00" | 6a2f6e4e-e0e5-4561-9055-3eedec166cc3 | 2011/09/15 12:40:30 | 5 | 0 |

SERVER SYSTEM, METHOD FOR CONTROLLING THE SAME, AND PROGRAM FOR EXECUTING PARALLEL DISTRIBUTED PROCESSING

BACKGROUND OF THE INVENTION

Field of the Invention

The present invention relates to a server system for executing parallel distributed processing, a method for controlling the same, and a program.

Description of the Related Art

In recent years, as forms in which a server computer performs various processes, techniques such as cloud computing systems and software as a service (SaaS) have begun to be used. In cloud computing, the execution of data processing is distributed in parallel using many computing resources. This enables the simultaneous processing of requests from many clients. Cloud computing is also characterized in that the serial processing of a job to be executed by a server is broken down into units of task processes, and the tasks of executing the respective task processes are linked together to process the job in parallel, whereby many jobs can be processed in a scalable manner. In the present specification, such a system is referred to as a "cloud system".

The publication of Japanese Patent Application Laid-Open No. 2011-095835 discusses a form in which in a cloud system, to improve the scalability of computer resources and prevent a system down at the peak of requests from clients, a back-end process actively and asynchronously acquires and executes a job. In such a form, if an abnormality has occurred in the back-end process and processing is not completed, a retry function for executing the processing again is required. If a retry is performed, even a back-end process different from the back-end process in which the abnormality has occurred can process the job. The term "back-end process" refers to a program that is recognized and managed as a different process by an operating system (OS) but executes the same processing as that of the back-end process in which the abnormality has occurred. An abnormality occurs in a back-end process when a hardware failure has occurred in a computer, or when a bug has occurred in software implemented in the back-end process.

If tasks are achieved by implementing prescribed processes in a back-end process, a mechanism of executing post-processing may be introduced into the tasks so that a job is normally processed. Examples of the post-processing include the process of notifying by email that job processing has failed, the process of outputting an error log, and the process of changing a status. Each process is a process for notifying a user that a job has not been normally processed, thereby expecting that the job will be processed again and then normally processed.

In a cloud system, however, a retry mechanism asynchronously performs parallel processing, and therefore, the same task does not necessarily repeatedly execute the same job. Thus, tasks cannot determine how many times an acquired job has been processed, and therefore, the tasks cannot execute post-processing at appropriate timing.

SUMMARY OF THE INVENTION

The present invention is directed to providing a server system for, if the number of task attempts has not exceeded the maximum number of attempts, transmitting a regular job to cause tasks to execute a particular process, and if the number of task attempts has exceeded the maximum number of attempts, transmitting a failed job to cause the tasks to execute post-processing corresponding to the particular process.

According to an aspect of the present invention, a server system can communicate with a plurality of tasks of executing prescribed processes, and causes the plurality of tasks, of which the prescribed processes are different from each other, to sequentially process a job having occurred, thereby achieving processing of the job. The server system includes a counting unit configured to count the number of task attempts according to a failure of a particular process executed by each of the tasks, and a job management unit configured to, when the tasks to execute the particular process has made a request to acquire the job, if the number of task attempts counted by the counting unit has not exceeded the maximum number of attempts, transmit a regular job, and if the number of task attempts counted by the counting unit has exceeded the maximum number of attempts, transmit a failed job, wherein, if the job management unit has transmitted the regular job, the tasks execute the particular process, and if the job management unit has transmitted the failed job, the tasks execute post-processing corresponding to the particular process.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is examples of scan tickets held in the scanning service server group according to the first exemplary embodiment of the present invention.

FIG. 8 is examples of templates held in the scanning service server group according to the first exemplary embodiment of the present invention.

FIG. 9 is an example of a user interface of the image forming apparatus according to the first exemplary embodiment of the present invention.

FIG. 10 is a system configuration diagram of each of task servers according to the first exemplary embodiment of the present invention.

FIG. 11 is a sequence diagram consisting of FIGS. 11a and 11b.

FIGS. 11a-11b are sequence diagrams illustrating the serial flow of a scanning process according to the first exemplary embodiment of the present invention.

FIG. 14 is an example of route information held in the route management service server group according to the first exemplary embodiment of the present invention.

FIG. 15 is an example of task information held in the route management service server group according to the first exemplary embodiment of the present invention.

FIG. 17 is an example of job information held in the job management service server group according to the first exemplary embodiment of the present invention.

FIG. 19 is an example of temporary file information held in the temporary file management service server group according to the second exemplary embodiment of the present invention.

FIG. 20 is an example of the definition of the maximum number of route attempts held in a route management service server group according to the second exemplary embodiment of the present invention.

FIG. 21 is an example of job information held in a job management service server group according to the second exemplary embodiment of the present invention.

DESCRIPTION OF THE EMBODIMENTS

Various exemplary embodiments, features, and aspects of the invention will be described in detail below with reference to the drawings.

In a cloud system, a retry mechanism asynchronously performs parallel processing, and therefore, the same task does not necessarily repeatedly execute the same job. Thus, tasks cannot determine how many times an acquired job has been processed, and therefore, the tasks cannot execute post-processing at appropriate timing. Since tasks cannot determine how many times a job has been processed, the implementation may be performed such that, for example, every time processing fails, a notification is given by email. In this case, however, if three retries have been performed, an email is transmitted for each failure. Thus, even though only one job has actually failed, three failure notifications are sent, which may confuse the user. A cloud system for solving this problem is described in detail. With reference to the drawings, the preferable mode for carrying out the present invention is described below.

Figure 1:
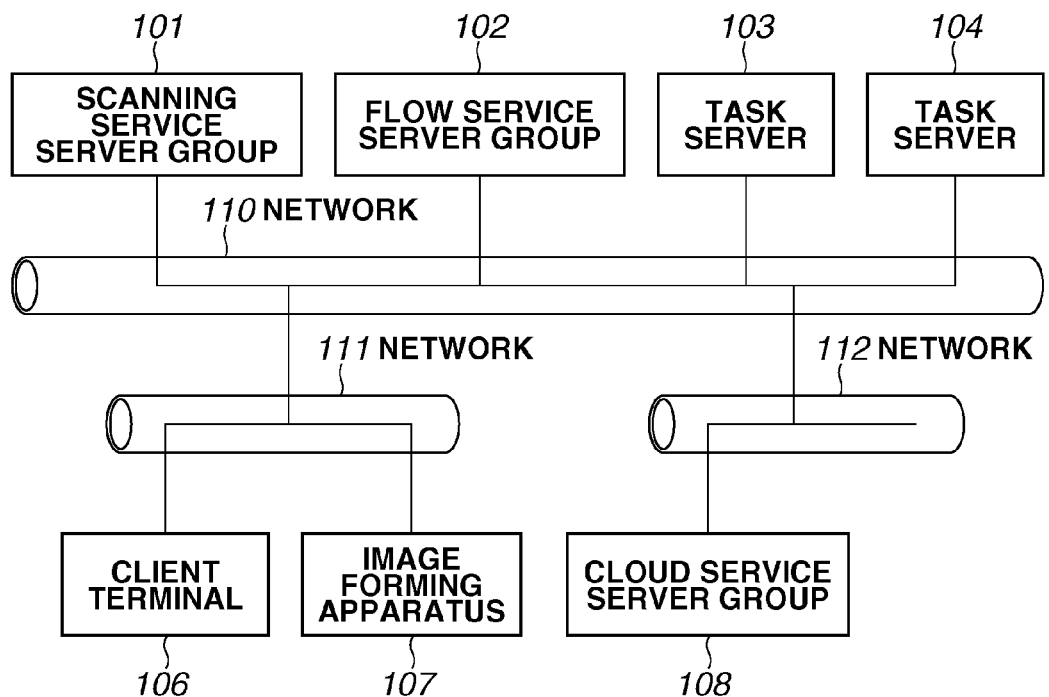
FIG. 1 is a diagram illustrating the overall configuration of a cloud system according to a first exemplary embodiment of the present invention.

FIG. 1 is a diagram illustrating the overall configuration of a system including a cloud system according to a first exemplary embodiment of the present invention. In FIG. 1, a scanning service server group 101, a flow service server group 102, task servers 103 and 104, a client terminal 106, an image forming apparatus 107, and a cloud service server group 108 are connected to one another via networks 110 to 112. In FIG. 1, it is assumed that there are a plurality of task servers 103, a plurality of task servers 104, a plurality of client terminals 106, a plurality of image forming apparatuses 107, and a plurality of cloud service server groups 108.

The networks 110 to 112 are communication networks achieved by, for example, a local area network (LAN) for the Internet, a wide area network (WAN), a telephone circuit, a dedicated digital circuit, an Asynchronous Transfer Mode (ATM) or frame relay circuit, a cable television circuit, and a data broadcasting wireless circuit. The networks 110 to 112 are also achieved by combinations of these. The networks 110 to 112 may only need to allow the transmission and reception of data. In a cloud service, normally, the networks 110 and 112 are the Internet, and the network 111 is an intranet or a network of a service provider. Generally, each of the scanning service server group 101, the flow service server group 102, and the task servers 103 and 104 includes a group of a plurality of server computers, and the group of servers provides a user with the cloud service. Each group of server computers, however, may include only a single server computer. For example, the flow service server group 102, which includes a group of servers having different functions, may be implemented as a process. As described above, there is no limit on the number of servers for achieving the present invention, and therefore, the term "server system" refers to a server including a single server or a group of servers.

A service provided by the scanning service server group 101 according to the first exemplary embodiment is a service for performing image processing on image data obtained by the user scanning an image by an image forming apparatus to save the image data in an external cloud service. Further, each of processing is achieved by the task servers 103 and 104, and each of the task servers 103 and 104 sequentially performs the processing, thereby providing a scanning service.

Further, various companies open the cloud service server group 108, which is an external server system, to the public on the Internet. Generally, the cloud service server group 108 is also realized on a plurality of server computers. The client terminal 106 is, for example, a desktop personal computer, a laptop personal computer, a mobile personal computer, or a personal data assistant (PDA). Alternatively, the client terminal 106 may be a mobile phone having an internal program execution environment. The client terminal 106 has an internal environment for executing a program such as a web browser (an Internet browser, a World Wide Web (WWW) browser, or a browser for using the World Wide Web).

Figure 2:
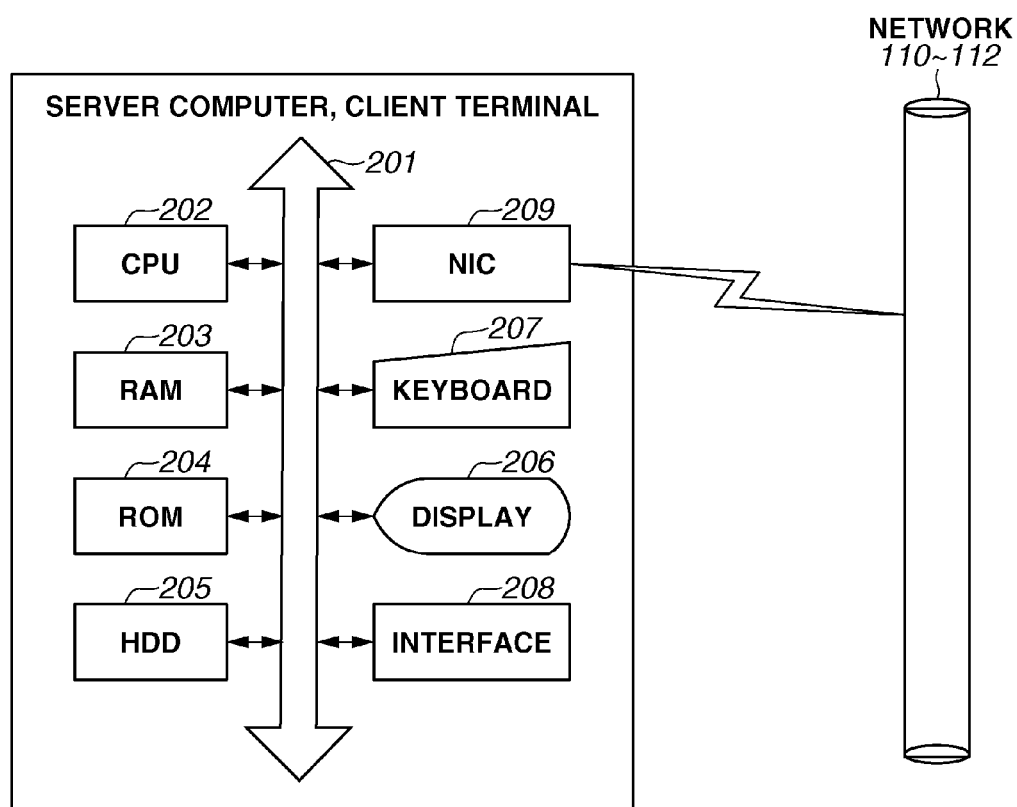
FIG. 2 is a hardware configuration diagram of each of a client terminal and server computers according to the first exemplary embodiment of the present invention.

FIG. 2 is a hardware configuration diagram of each of the client terminal 106 and the server computers that execute the group of services 101 to 104 according to the first exemplary embodiment. In FIG. 2, a central processing unit (CPU) 202 controls the entirety of the apparatus. The CPU 202 performs control to execute an application program and an OS stored in a hard disk drive (HDD) 205, and temporarily store, in a random-access memory (RAM) 203, information and a file necessary to execute a program. A read-only memory (ROM) 204 is a storage unit and stores various types of data of a basic input/output (I/O) program and the like. The RAM 203 is a temporary storage unit and functions as a main memory and a work area for the CPU 202. The HDD 205 is one of external storage units. The HDD 205 functions as a large-capacity memory and stores an application program such as a web browser, programs for the service, an OS, and related programs. A display 206 is an exhibit unit and displays a command input through a keyboard 207. An interface 208 is an external device interface (I/F) and connects to a printer, a Universal Serial Bus (USB) device, and a peripheral device. The keyboard 207 is an instruction input unit. A system bus 201 governs the flow of data in the apparatus. A network interface card (NIC) 209 exchanges data with an external device via the interface 209 and the networks 110 to 112. The above configuration of the computer is merely illustrative, and is not limited to the exemplary configuration in FIG. 2. For example, the storage locations of data and a program can be changed among the ROM 204, the RAM 203, and the HDD 205 according to the features of the data and the program.

Figure 3:
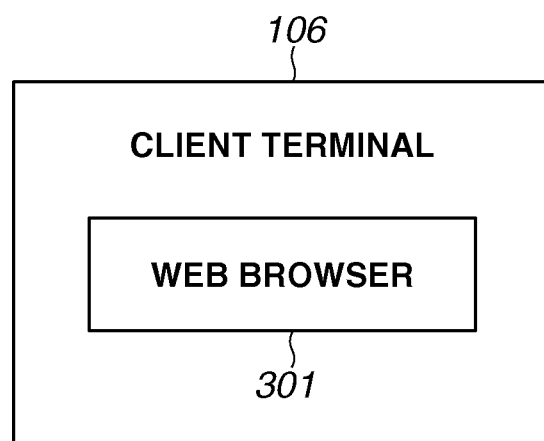
FIG. 3 is a system configuration diagram of the client terminal according to the first exemplary embodiment of the present invention.

FIG. 3 is a system configuration diagram of the client terminal 106 according to the first exemplary embodiment. In FIG. 3, the client terminal 106 transmits a request to a web application provided by the scanning service server group 101 and displays a response, using a web browser 301. The user of the cloud service uses a service in the cloud system through the web browser 301 of the client terminal 106. The web browser 301 is achieved by the CPU 202 executing a web browser program saved in the HDD 205.

Figure 4:
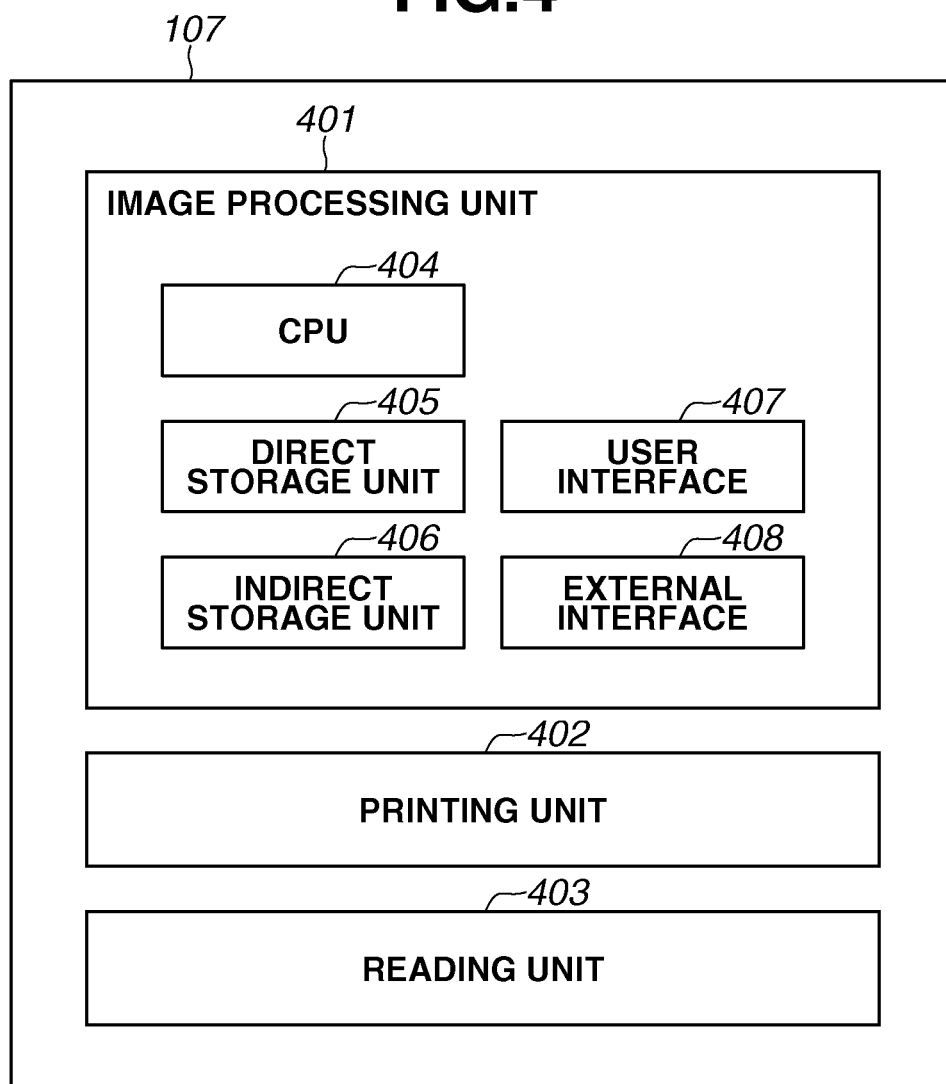
FIG. 4 is a diagram illustrating the details of the internal configuration of an image forming apparatus according to the first exemplary embodiment of the present invention.

FIG. 4 is a block diagram illustrating an example of the internal configuration of the image forming apparatus 107 according to the first exemplary embodiment. The first exemplary embodiment is described taking as an example an image forming apparatus having both a scan function and a print function. Alternatively, to achieve a scanning service, a scan-only apparatus without a print function may also be used. In FIG. 4, the image forming apparatus 107 includes an image processing unit 401, a printing unit 402, and a reading unit 403. The image processing unit 401 includes a CPU 404, a direct storage unit 405, an indirect storage unit 406, a user interface 407, and an external interface 408.

The CPU 404 is a unit for executing a predetermined program to instruct various types of control of the image forming apparatus 107. The direct storage unit 405 is a work memory used by the CPU 404 when the CPU 404 executes a program. At this time, the program to be executed by the CPU 404 is loaded into the direct storage unit 405. The direct storage unit 405 is achieved by a RAM. The indirect storage unit 406 stores various programs including an application program and a platform program. Each of the various programs stored in the indirect storage unit 406 is moved to the direct storage unit 405 when the CPU 404 executes the program. The indirect storage unit 406 is achieved by a solid-state drive (SSD) or an HDD. The CPU 404 may be a multiprocessor.

A platform is described in detail. The platform achieved enables a new application independently developed by the user to be executed on the image forming apparatus 107, and also enables the customization of the operation screen of the image forming apparatus 107.

A method of achieving the platform is described. The CPU 404 moves the platform program stored in the indirect storage unit 406 to the direct storage unit 405. When the movement of the platform program is completed, the CPU 404 can execute the platform program (e.g., Java (registered trademark)). In the exemplary embodiments of the present invention, the fact that the CPU 404 executes the platform program is referred to as "the platform starts". The platform operates on the firmware of the image forming apparatus 107. The platform program provides an environment for executing an application program described in an object-oriented manner.

A method of executing the application program on the platform is described in detail. In the first exemplary embodiment, scanning software that transmits a scanned image to the cloud service is operating on the platform. The scanning software receives a list of scan tickets by a communication protocol such as the Hypertext Transfer Protocol (HTTP) from the scanning service server group 101 to which the image forming apparatus 107 is connected via the networks 110 and 111. In each scan ticket, information is recorded, such as the settings for scanning and the processing flows after the scanning. Hereinafter, a software unit achieved by executing the scanning software is referred to as a "scanning software unit". The user selects a scan ticket from the list of scan tickets displayed on the scanning software unit, and causes a document to be read. This enables the user to receive a scanning service. The scanning software unit transmits the information of the scan ticket selected by the user and image data together to the scanning service server group 101. The application program may thus be executed on the platform, whereby control of the image forming apparatus 107 can be achieved.

A method of executing the application program is described. The activated platform moves the application program stored in the indirect storage unit 406 to the direct storage unit 405. When the movement is completed, the platform can execute the application program. Then, the platform executes the application program. In the exemplary embodiments of the present invention, the function of the platform that can be provided by thus executing the application program is referred to as a "platform application". Further, the platform can perform a part of the processes in flow charts discussed in the exemplary embodiments of the present invention.

The user interface 407 is a unit required to receive a processing request from the user. For example, the user interface 407 receives a signal according to an instruction input through a keyboard or a mouse by the user. The external interface 408 can transmit and receive data to and from an external device. Examples of the external device include an external storage device, such as an external HDD and an external USB memory, and a separate device to which the image forming apparatus 107 is connected via a network, such as a separate host computer and an image forming apparatus. The image forming apparatus 107 can communicate with the client terminal 106 and the scanning service server group 101 via the networks 110 and 111.

Next, descriptions are given of the service server groups that provide the cloud service, namely the scanning service server group 101 and the task servers 103 and 104. Further, with reference to a sequence diagram of a scanning process in FIG. 11, the flow of the processing of a cloud scanning service is described together with the service server groups.

Figure 5:
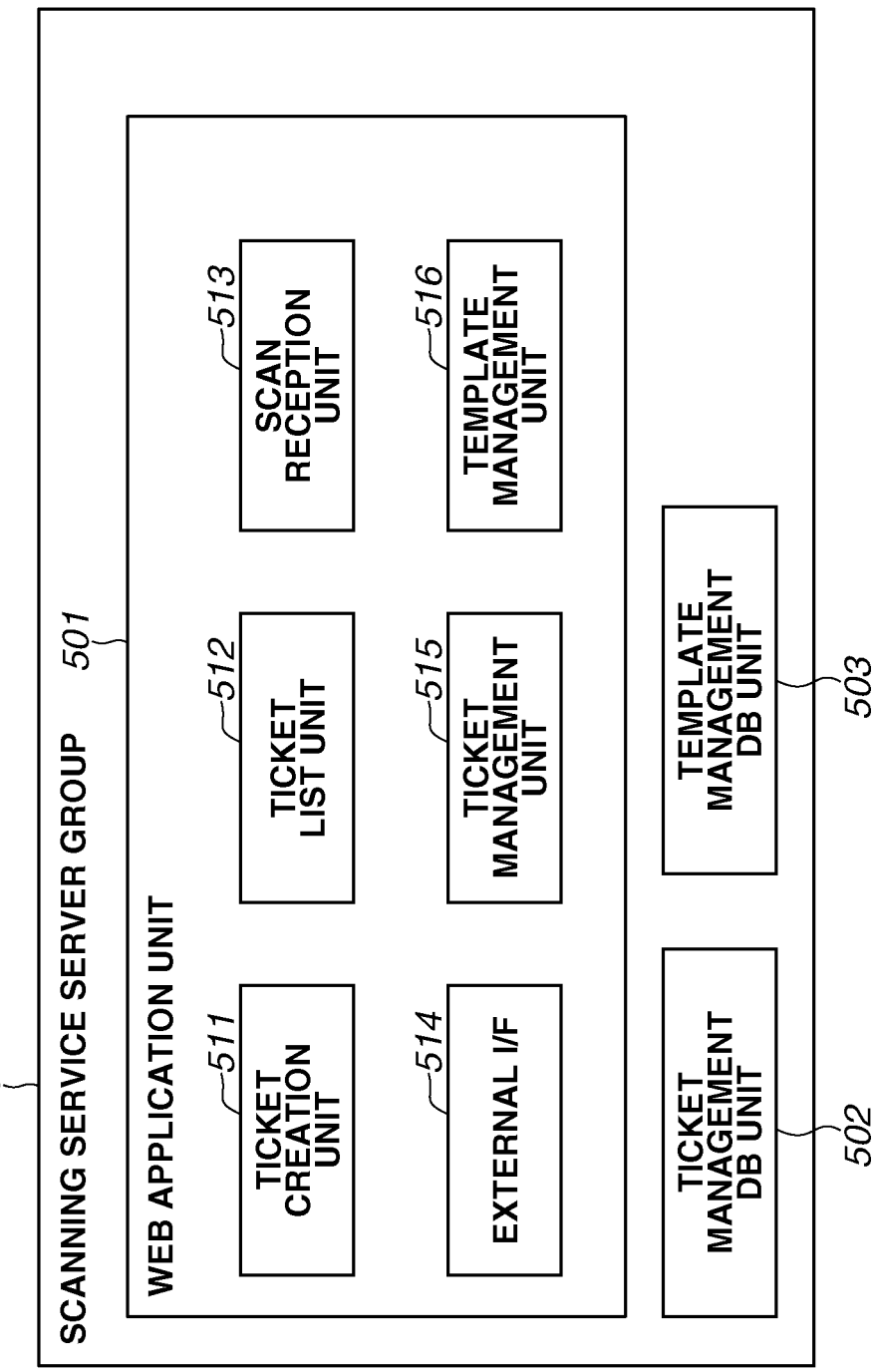
FIG. 5 is a system configuration diagram of a scanning service server group according to the first exemplary embodiment of the present invention.

With reference to FIG. 5, the scanning service server group 101 is described. The scanning service server group 101 is a service server group that provides a scan function in the cloud service. FIG. 5 is a system configuration diagram of the scanning service server group 101 according to the first exemplary embodiment. The scanning service server group 101 includes a web application unit 501, a ticket management database (DB) unit 502, and a template management DB unit 503. These components execute various processes, thereby providing the user with the scanning service server group 101. These components are achieved by the CPU 202 executing various programs saved in the HDD 205.

The web application unit 501 is an application program that provides the scan function. A ticket creation unit 511 achieves a series of functions for the user to create a scan ticket. In the scan ticket, the following are recorded: the scan settings when a document is scanned using the image forming apparatus 107; the definitions of the processing flows after the scanning; and parameters for tasks to be performed in each processing flow.

Figure 6:
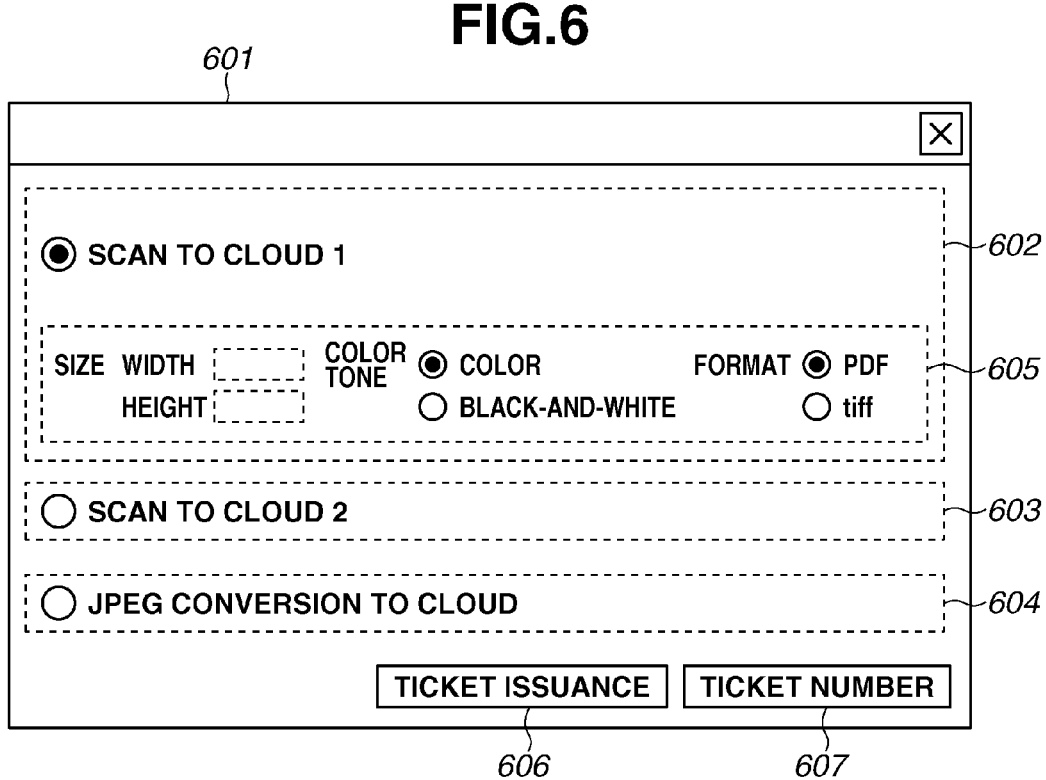
FIG. 6 is an example of a user interface of the scanning service server group according to the first exemplary embodiment of the present invention.

Referring to FIG. 11, in step S1101, the ticket creation unit 511 receives a scan ticket creation screen request from the web browser 301 of the client terminal 106. The ticket creation unit 511 generates a scan ticket creation screen, and in step S1102, makes a response. At this time, the ticket creation unit 511 acquires templates for scan tickets registered in the template management DB unit 503 from a template management unit 516, and displays on the web browser 301 the template names included in the templates. The detailed contents of the template management DB unit 503 will be described later with reference to FIG. 8. Further, a screen on which the template names are displayed is as illustrated in FIG. 6, and the display screen will also be described later.

In step S1103, the user operates the web browser 301 to make a scan ticket creation request, thereby requesting the ticket creation unit 511 to create a scan ticket and requesting a ticket management unit 515 to save the scan ticket. The ticket management unit 515 receives the request to save the ticket, and saves the scan ticket in the ticket management DB unit 502. The detailed contents of the ticket management DB unit 502 are illustrated in FIG. 7. The details of the ticket management DB unit 502 will be described later. The ticket management unit 515 saves the scan ticket, and then in step S1104, makes a response.

An external I/F 514 communicates with the scanning software unit that operates on the image forming apparatus 107. The scanning software unit accesses the functions of a ticket list unit 512 or the functions of a scan reception unit 513 through the external I/F 514. In step S1105 of FIG. 11, the scanning software unit of the image forming apparatus 107 acquires a list of tickets from the ticket list unit 512 through the external I/F 514. The ticket list unit 512 generates a list of scan tickets from the ticket management unit 515, and in step S1106, makes a response to the scanning software unit. Having received the response, the image forming apparatus 107 displays the acquired list of tickets on the user interface 407 in FIG. 4. An example of the display screen is illustrated in FIG. 9. The example of the display screen will be described later.

In a scanning process in step S1107 of FIG. 11, the user selects any one of the tickets displayed on the user interface 407, places a sheet of paper on a scanning device included in the image forming apparatus 107, and executes scanning. Thus, in step S1108, the scanning software unit transmits the scan by transmitting the scanned image data and the scan ticket to the scan reception unit 513 through the external I/F 514.

The scan reception unit 513 receives the transmitted scan ticket and image data. In step S1109, the scan reception unit 513 inputs the received image data to the flow service server group 102. If having properly received the image data, the flow service server group 102 responds to the scanning service server group 101 with an identifier (ID) (a file group ID) for uniquely identifying the image data. Then, in step S1111, the scan reception unit 513 submits a job by transmitting the file group ID and the scan ticket to the flow service server group 102. This is the system configuration of the scanning service server group 101 and the flow until the submission of a scan job.

With reference to FIG. 6, a ticket creation screen 601 is described. The ticket creation screen 601 displays templates (602, 603, and 604 in FIG. 6) acquired from the template management DB unit 503 in FIG. 5. The user selects a template to be executed among the displayed templates. If a template has been selected, a screen 605 for making advanced ticket settings is displayed. In FIG. 6, the advanced setting screen 605 is displayed on the same screen. Alternatively, the advanced setting screen 605 may open in another window. In the advanced setting screen 605, scan settings can be made according to the selected template. Examples of the scan settings include, as illustrated in FIG. 6, settings such as the size, the color tone, namely color or black-and-white, and the format of scan data. If the user has made advanced settings and then pressed a ticket issuance button 606, information of a ticket is newly created in the ticket management DB unit 502 in FIG. 5. Scan tickets saved in the ticket management DB unit 502 will be described later. If a scan ticket has been properly created in the ticket management DB unit 502, an ID uniquely assigned to the ticket is displayed in a ticket number 607. The ID has the same value as that of a ticket ID 702 in FIG. 7. The user memorizes the ID displayed in the ticket number 607 and moves to the image forming apparatus 107.

FIG. 7 illustrates an example of information managed by the ticket management DB unit 502. A user ID 701 is an ID uniquely representing the user having created each ticket. A ticket ID 702 is an ID for uniquely defining the ticket. The ticket ID 702 is generated by the ticket creation unit 511 when the ticket issuance button 606 in FIG. 6 has been pressed. Then, the ticket ID 702 is saved in the ticket management DB unit 502. A route ID 703 is a route ID corresponding to the template selected by the user on the ticket creation screen 601. If the user has selected a ticket and executed scanning, the scan data is processed in the order of tasks defined by the route ID 703. In parameters 704, the scan settings made on the advanced setting screen 605 are recorded.

FIG. 8 illustrates examples of templates managed by the template management DB unit 503. The template management DB unit 503 is a database for linking route information managed by a route information management DB unit 1301 in FIG. 13, with templates displayed on the ticket creation screen 601. Each template includes a template ID 801, a template name 802, and a route ID 803. The template ID 801 is an ID uniquely representing the template. The template name 802 is the name displayed on the ticket creation screen 601 in FIG. 6. The route ID 803 represents a foreign key to a route ID 1401 managed by the route information management DB unit 1301 in FIG. 14.

FIG. 9 illustrates an example of a screen on which the scan tickets acquired when the list of tickets has been acquired in step S1105 of FIG. 11 are displayed. This screen is displayed on the user interface 407 of the image forming apparatus 107. On the screen, the ticket ID 702 acquired from the ticket management DB unit 502 is displayed (901 to 906). The user selects a ticket to be executed, places a document to be scanned on the image forming apparatus 107, and presses a scan button 907. Consequently, in step S1108 of FIG. 11, the scan is transmitted. If the scan has been transmitted in step S1108, the scanned data and the ticket are transmitted to the scan reception unit 513 of the scanning service server group 101.

Next, FIG. 10 illustrates a system configuration diagram of each of the task servers 103 and 104 according to the first exemplary embodiment. Each of the task servers 103 and 104 is a server that executes an element function for achieving a scanning service. The first exemplary embodiment is described taking task servers as examples. Alternatively, for example, the first exemplary embodiment may be achieved as a process of the flow service server group 102. Corresponding to both a process and servers, in the first exemplary embodiment, the term "task" is simply used. There are, for example, a task server that performs image processing on image data and a task server that performs the process of transmitting image data to the cloud service server group 108, which is different from the task server and provides a file sharing function. In the first exemplary embodiment, the task server 103 performs an optical character recognition (OCR) process on image data and performs the process of embedding text data of the OCR results into the image data. Further, the task server 104 performs the process of transmitting image data to a particular service that provides a storage function in the cloud service server group 108, and storing the image data in the cloud service server group 108. Each function is achieved by a regular processing unit 1013.

As described above, there is a plurality of task servers that execute different prescribed processes. The plurality of task servers, in which the prescribed processes are different from each other, sequentially processes a job that comes up, thereby processing the job. For example, as one conceivable form, image processing is performed on image data generated by scanning an image in an image forming apparatus, and a transmission process for transmitting the image data subjected to the image processing to an external server system is executed. As the functions of the task servers, not only image processing and a transmission process, but also other processes can be achieved.

Further, each of the task servers 103 and 104 has the function of executing post-processing if the above element function (the process of embedding the OCR results into image data, or the process of storing image data in the cloud service server group 108) has failed. Examples of the specific content of the post-processing may include: an output process in which the task server 103 or 104 outputs an error log indicating the content of an error; a notification process in which the task server 103 or 104 gives a notification as an error email indicating the content of an error to the person having executed the scanning; and a status display process in which the task server 103 or 104 changes the status displayed on a screen to an error status, thereby displaying the error status.

There are a plurality of task servers 103 and a plurality of task servers 104. This is because the purpose of task servers is to serve as a platform for achieving element functions. The element functions are provided with scalability, which allows availability and large-scale processing simultaneously in parallel, and with availability, in which even if one server crashes, another server substitutes for the server having crashed. Since the task servers 103 and 104 are positioned as a platform, a regular processing unit 1013 and a post-processing unit 1014 of each of the task servers 103 and 104 are intended to have a configuration that can be programmed and installed by a service developer. This enables the service developer to freely determine, using the cloud system, what kind of function is to be executed on an acquired job and what kind of processing is to be executed if the execution of the function has failed. Further, naturally, another server does not repeatedly and indefinitely retry processing a job as a substitute. If the processing has failed even after a certain number of retries is carried out, it is necessary to bring the job into a failed state and perform post-processing.

However, another task server or another task process performs a retry process as a substitute. Thus, tasks cannot count the number of failures. Further, it is undesirable that every time a task server or a task process fails in processing, post-processing should be executed. For example, if first and second attempts have failed and a third attempt has been successful, failure emails may be transmitted to the person having executed the scanning, in the first post-processing and the second post-processing. This leads to contradiction that even though an attempt has been successful, the person having executed the scanning receives failure emails. Further, if a person has submitted two jobs, one of the jobs may be successful, and another job may fail in all three retries. In this case, three failure emails may be sent to the person. This makes it difficult for the person having received the emails to understand how many jobs have failed, which may cause confusion.

Each of the task servers 103 and 104 does not necessarily need to include only a single set of components, namely a task control unit 1011, a job communication unit 1012, the regular processing unit 1013, and the post-processing unit 1014. Alternatively, each of the task servers 103 and 104 may include a plurality of sets of these components as a process on the OS. The components are described below, along with the flow of the sequence diagram of the scanning process in FIG. 11. In steps S1112, S1113, S1120, and S1121, the task server 103 or 104 periodically makes inquiry to the flow service server group 102 and acquires tasks that can be processed by the task server 103 or 104. The detailed flow of a response from the flow service server group 102 to the task server 103 or 104 will be described later with reference to FIG. 22.

In steps S1112 and S1120, the task control unit 1011 of the task server 103 or 104 periodically makes inquiry to the flow service server group 102 using the job communication unit 1012. In other words, the task control unit 1011 that is standing by and is not processing a job, polls the flow service server group 102 to acquire a job. If a job that can be processed by the task server 103 or 104 is present, then in steps S1113 and S1121, the job communication unit 1012 acquires the job that can be processed, as a response to the inquiry. The detailed flow of a response from the flow service server group 102 to the task server 103 or 104 will be described later with reference to FIG. 22.

Further, in steps S1114, S1115, S1122, and S1123, the job communication unit 1012 of the task server 103 or 104 also acquires image data to be processed from the flow service server group 102 based on information of the acquired job.

Figure 23:
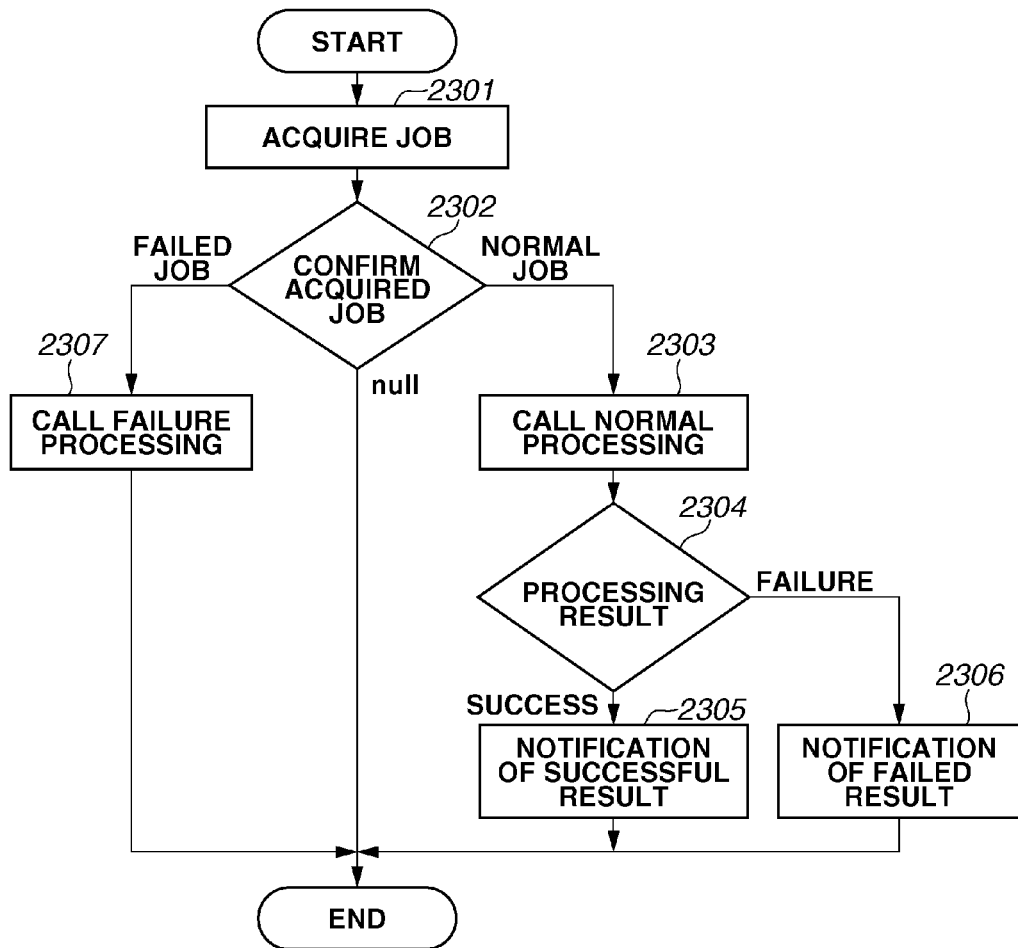
FIG. 23 is a flow chart regarding processing performed by each of the task servers according to the first exemplary embodiment of the present invention.

In steps S1116 and S1124, the regular processing unit 1013 of the task server 103 or 104 is called by the task control unit 1011 to perform various processes on the image data acquired by the job communication unit 1012. If the job acquired by the job communication unit 1012 has been a failed job, the post-processing unit 1014 of the task server 103 or 104 is called by the task control unit 1011. The detailed flow of this case will be described later with reference to FIG. 23.

In steps S1117 and S1125, the job communication unit 1012 of the task server 103 or 104 periodically gives a state notification to the flow service server group 102. In step S1118, the regular processing unit 1013 of the task server 103 saves the processing results of step S1116 in the flow service server group 103 through the task control unit 1011 and the job communication unit 1012. In step S1126, the regular processing unit 1013 of the task server 104 transmits data of the processing results of step S1124 to the cloud service server group 108. Further, in steps S1119 and S1127, the job communication unit 1012 of the task server 103 or 104 notifies the flow service server group 102 of the processing result of the regular processing unit 1013 as a result request based on an instruction from the task control unit 1011. The detailed flow of a response from the flow service server group 102 to a result request from the task server 103 or 104 will be described later with reference to FIG. 22.

Figure 12:
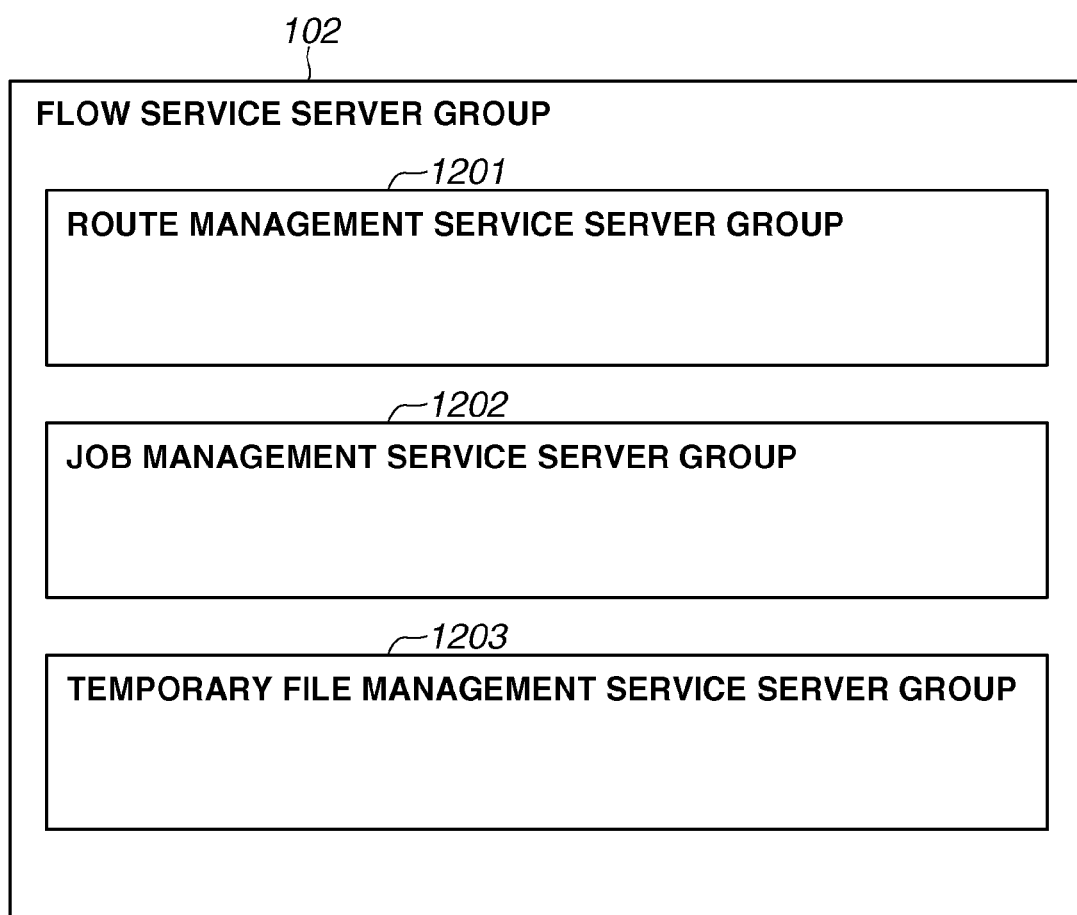
FIG. 12 is the outline of a system configuration diagram of a flow service server group according to the first exemplary embodiment of the present invention.

Next, the flow service server group 102 is described in detail. The flow service server group 102 is a main service server group in the present invention and is a service server group that performs route management, job management, and temporary file management. FIG. 12 illustrates the outline of the system configuration of the flow service server group 102.

The flow service server group 102 includes server groups, namely a route management service server group 1201, a job management service server group 1202, and a temporary file management service server group 1203. Services for executing various processes are provided on these servers, and these services cooperate to provide the user with the flow service server group 102. The route management service server group 1201 manages information of a route linking tasks together. The job management service server group 1202 manages the processing of a job based on information of a route.

The temporary file management service server group 1203 manages the saving of data when a job is submitted, and the saving of data of the processing result of each task. Subsequently, detailed descriptions are given of the components of the flow service server group 102, namely the route management service server group 1201, the job management service server group 1202, and the temporary file management service server group 1203.

Figure 13:
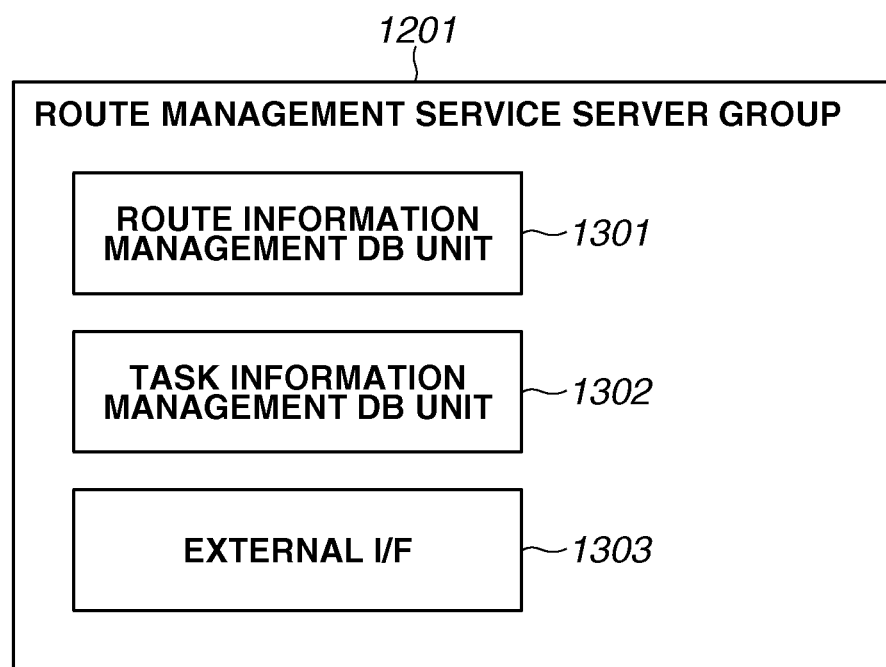
FIG. 13 is a system configuration diagram of a route management service server group according to the first exemplary embodiment of the present invention.

FIG. 13 illustrates the system configuration of the route management service server group 1201. The route management service server group 1201 includes a route information management DB unit 1301, a task information management DB unit 1302, and an external I/F 1303. The route information management DB unit 1301 holds the order in which tasks sequentially execute processing, that is, information for defining the links between tasks in units of routes. The task information management DB unit 1302 defines prescribed processes in units of tasks and holds information regarding the tasks. The external I/F 1303 is an interface for making inquiry to the route management service server group 1201, and is an interface through which the job management service server group 1202 refers to the route information management DB unit 1301 and the task information management DB unit 1302.

FIG. 14 illustrates information managed by the route information management DB unit 1301. A route ID 1401 is an ID for uniquely identifying each route. A sequence number 1402 holds information as to an order of each task to be executed in the route A task ID 1403 holds information as to a task to be executed. The maximum number of attempts 1404 defines, if each task has failed, how many times the task can process the job. When a task has transmitted a job acquisition request from the job management service server group 1202, if the maximum number of attempts has not been reached, another task that executes the same prescribed process can acquire the same job.

For example, in data 1413, 1414, and 1415, the route ID 1401 defines a route 002. The definition is as follows. The task represented by the data 1413 is a task to execute processing first. According to the task ID 1403, a task 1 executes processing first. Similarly, a task 3, of which the sequence number 1402 is 2, is a task to execute processing second. A task 5 is to execute processing last. That is, processing is sequentially executed in the order of the task 1, the task 3, and the task 5, thereby processing a job.

FIG. 15 illustrates an example of information managed by the task information management DB unit 1302. A task ID 1501 is an ID uniquely identifying each task. A task name 1502 is the name of the task. A cessation time 1503 is the time until the job management service server group 1202 ceases the processing of the task server 103 or 104. If the task server 103 or 104 is in an execution state for a time equal to or longer than the time indicated by the cessation time 1503, the job management service server group 1202 determines that an abnormality has occurred in the task server 103 or 104. Then, the job management service server group 1202 delegates the job to another task server 103 or 104 that executes the same prescribed process. In the task server 103 or 104, various abnormalities occur, such as the case where a hardware failure occurs, the case where a software bug occurs, or the case where the task server 103 or 104 cannot communicate due to a network disconnection. Further, the task server 103 or 104 may be in an execution state for a long time also when enormous data is to be processed in the case of, for example, image processing or the process of saving data in an external cloud. Also in such a case, it is determined that an abnormality has occurred. A state notification time 1504 indicates the time at which the job management service server group 1202 gives a state notification to the task server 103 or 104. If a state notification has not been given for several seconds of extra time or longer even after the time indicated by the state notification time 1504 has elapsed, the job management service server group 1202 delegates the job to another task server 103 or 104. Thus, even if an abnormality has occurred to the task server 103 or 104, these cessation processes enable the task server 103 or 104 to which a job has been delegated, to complete the execution of the job.

Figure 16:
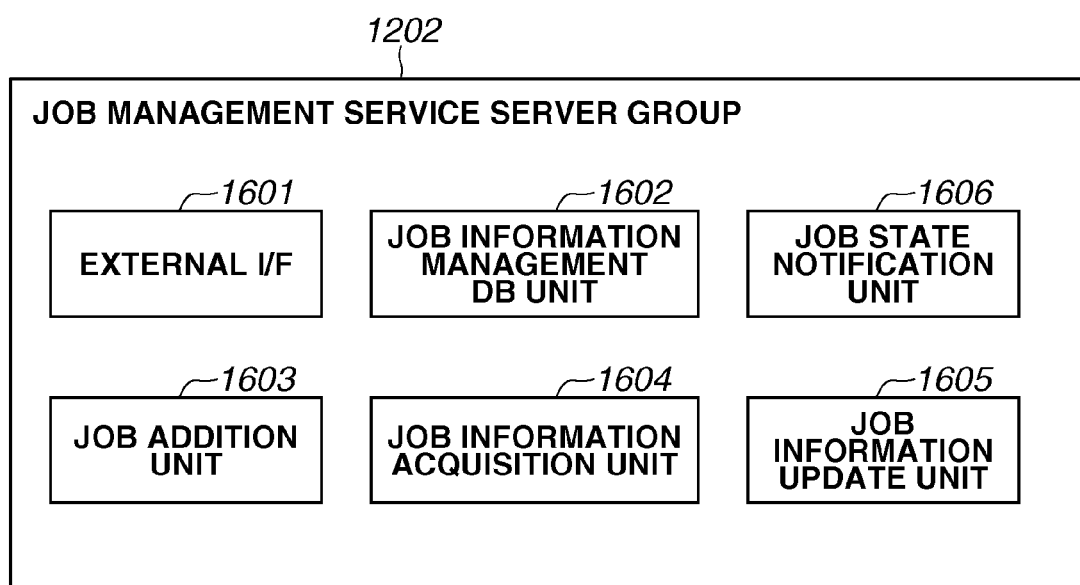
FIG. 16 is a system configuration diagram of a job management service server group according to the first exemplary embodiment of the present invention.

With reference to FIG. 16, the job management service server group 1202 is described. The job management service server group 1202 is a service server group that transmits and receives task information in response to a request from the task server 103 or 104, and manages the state of each job.

An external I/F 1601 communicates with the task servers 103 and 104 and the image forming apparatus 107. The task servers 103 and 104 and the image forming apparatus 107 access the functions of the job management service server group 1202 through the external I/F 1601. A job information management DB unit 1602 manages the status of each created job and the ID of data handled by each job. The detailed contents of the job information management DB unit 1602 are illustrated in FIG. 17, and the contents of the job information management DB unit 1602 will be described later. Referring to FIG. 11, in step S1110, the scanning service server group 101 receives a job submission request issued through the external I/F 1601, and a job addition unit 1603 stores job information in the job information management DB unit 1602.

Job information includes columns (1701 to 1707) present in the job information management DB unit 1602 illustrated in FIG. 17. In steps S1112 and S1120, a job information acquisition unit 1604 receives a task acquisition request issued through the external I/F 1601 from the task server 103 or 104, and acquires job information from the job information management DB unit 1602. In steps S1113 and S1121, when tasks are acquired, the acquired job information is transferred to the task server 103 or 104. The details of the transfer of the job information will be described later with reference to FIG. 22. In steps S1119 and S1127, when a result notification is given, a job information update unit 1605 receives a job information update request issued through the external I/F 1601 from the task server 103 or 104, and updates the information of the job in the job information management DB unit 1602. The information to be updated includes a current task ID 1704, a status 1705, and a last update time 1706. Before updating the current task ID 1704, the job information update unit 1605 acquires a next task ID in the route ID from the route information management DB unit 1301 through the external I/F 1303 of the route management service server group 1201. The job information update unit 1605 updates the current task ID 1704 using the acquired task ID. Further, the job information update unit 1605 updates the status 1705 to "waiting for processing (0)", and the last update time 1706 to the current time. In steps S1117 and S1125, when a state notification is given, a job state notification unit 1606 receives a state notification request issued through the external I/F 1601 from the task server 103 or 104.

Next, with reference to FIG. 17, data held in the job information management DB unit 1602 is described. A job ID 1701 is an ID uniquely assigned to each piece of job information. In a route ID 1702, a route ID corresponding to each of the templates selected on the ticket creation screen 601 in FIG. 6 is stored. A file group ID 1703 is an ID issued by the temporary file management service server group 1203. The current task ID 1704 is a task ID indicating a task to perform processing in the job. The task server 103 or 104 confirms the current task ID 1704, selects a row including the current task ID equal to the task ID assigned to the task server 103 or 104, thereby performing the processing. If the processing of the task has been completed, the job information update unit 1605 updates the ID to the task ID of the next task in the route ID. In the status 1705, a value representing any one of "waiting for processing (0)", "in execution (1)", "error occurrence (2)", and "completion (3)" is set. When selecting a job, basically, the task server 103 or 104 selects a row in which the status is set to "waiting for processing (0)". This can prevent the situation where a plurality of task servers process the same task.

After having selected a job, the task server 103 or 104 changes the status 1705 to "in execution (1)" through the external I/F 1601 using the job status change unit 1605. The last update time 1706 is updated when the task server 103 or 104 has executed a certain process on the job. Examples of the certain process include a status update process and a job acquisition process. When the task server 103 or 104 acquires a job, there may be a plurality of pieces of job information having IDs equal to the task ID assigned to the task server 103 or 104. In this case, the task server 103 or 104 selects a job of which the last update time 1706 is the earliest. This enables averagely processing all jobs. Parameters 1707 describe setting information set on the advanced setting screen 605 and setting information that the task server 103 or 104 transfers to another task server 103 or 104. A timestamp 1708 is a value automatically updated every time the job information is updated.

When communicating with the job information update unit 1605 and the job state notification unit 1606, the task server 103 or 104 transfers the timestamp 1708, and thereby can guarantee that the job has not been delegated to another task server 103 or 104. A last state notification time 1709 is a time saved in the job information acquisition unit 1604 for delegating a job that is still being executed for a predetermined time period, to another task server 103 or 104. If the cessation time 1503 has elapsed from the last state notification time 1709, the job is delegated to another task server 103 or 104. The number of task attempts 1710 represents the number of times the task has attempted the job. The number of task attempts 1710 is counted every time the task fails a prescribed process.

The temporary file management service server group 1203 is a service server group that, according to a request from the scanning service server group 101 or the task server 103 or 104, stores a file and manages the path to the storage location for the file. If a file acquisition request has been received from the task server 103 or 104, the temporary file management service server group 1203 returns binary data of a saved file to the task server 103 or 104. Further, if a file deletion request has been received from the task server 103 or 104 or the job management service server group 1202, the temporary file management service server group 1203 deletes a saved file. The temporary file management service server group 1203 enables the scanning service server group 101 and the task servers 103 and 104 to save, acquire, and delete a file without taking into account the path to the storage location of the file and the state of a file server.

Figure 22:
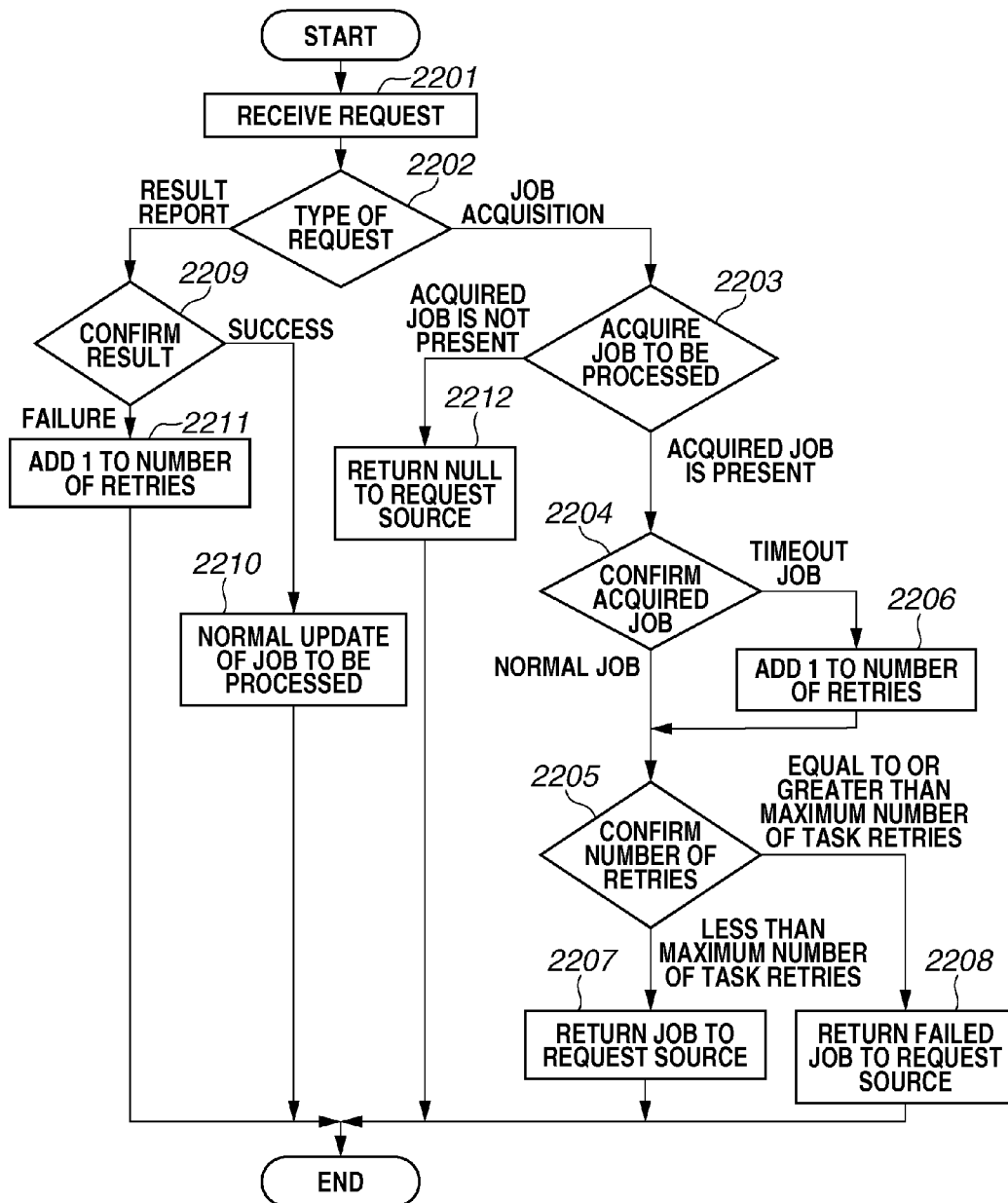
FIG. 22 is a flow chart regarding a task response made by the job management service server group to each of the task servers, according to the first exemplary embodiment of the present invention.

With reference to FIG. 22, a description is given of a response flow when the job management service server group 1202 has received a request regarding a job from the task server 103 or 104. In step 2201, the job management service server group 1202 receives a request regarding a job from the task server 103 or 104. In step 2202, the job management service server group 1202 determines the type of the request. If the request is a job acquisition request, step 2203 is executed. If the request is a result report request, step 2209 is executed. While a job acquisition request includes a task ID, in step 2203, the job management service server group 1202 acquires only one job to be processed among jobs linked with the task ID. At this time, the job management service server group 1202 determines a job of which the job record matches the following conditions, as a target to be acquired from the job information management DB unit 1602. The conditions for an acquisition target are that: the current task ID 1704 matches the task ID included in the acquisition request; and the status 1705 is "waiting for processing (0)", or if the status 1705 is "in execution (1)", the cessation time 1503 has elapsed from the last state notification time 1709. In step 2203, if an acquired job is present, the processing branches to step 2204. If an acquired job is not present, the processing branches to step 2212.

In step 2212, the job management service server group 1202 returns null to the request source task and ends this flow. If null has been received, the task server 103 or 104 determines that a job to be processed is not present. Then, the task server 103 or 104 performs a polling process for making an inquiry again after a predetermined time period. In step 2204, the job management service server group 1202 confirms the acquired job. If the acquired job is a normal job, step 2205 is executed. If the acquired job is a timeout job, step 2206 is executed. A normal job is a job of which the status 1705 is "waiting for processing (0)". A timeout job is a job of which the status 1705 is "in execution (1)". This is because, as described in the acquisition conditions in step 2203, if the job record of a job matches the acquisition conditions when the status 1705 is "in execution (1)", the cessation time 1503 of the job needs to have elapsed from the last state notification time 1709.

In step 2205, the job management service server group 1202 confirms the number of task attempts 1710 of the acquired job. If the number of task attempts 1710 is less than the maximum number of task attempts 1404, step 2207 is executed. If the number of task attempts 1710 is equal to or greater than the maximum number of task attempts 1404, step 2208 is executed. In step 2207, the job management service server group 1202 changes the status 1705 to "in execution (1)" and changes the last state notification time 1709 to the current time. Then, the job management service server group 1202 returns a regular job to the request source task. In step 2208, the job management service server group 1202 changes the status 1705 to "error occurrence (2)" and returns a failed job to the request source task.

If, on the other hand, it has been determined in step 2202 that the type of the request is a result report request, step 2209 is executed. The request includes the processing result and the job ID of a job to be processed. In step 2209, the job management service server group 1202 confirms whether the processing result included in the request is a success or a failure. If, as a result of the confirmation, the processing result is a success, the processing branches to step 2210. If, as a result of the confirmation, the processing result is a failure, the processing branches to step 2211. In step 2210, the job management service server group 1202 searches the job information management DB unit 1602 for a record that matches the job ID included in the request. Then, the job management service server group 1202 executes a normal update of the job. The term "normal update" here refers to the process of changing the current task ID 1704 to a next task ID with reference to the route information management DB unit 1301, changing the status 1705 to "waiting for processing (0)", changing the number of task attempts 1710 to 0, and changing the last update time 1706 to the current time. If, however, a next task ID does not exist, the normal update is the process of changing the status 1705 to "completion (3)" and changing the last update time 1706 to the current time. In step 2211, in order to count the number of task failures, the job management service server group 1202 updates the number of task attempts 1710 by adding 1 to the number of task attempts 1710. Thus, the processing flow illustrated in FIG. 22 enables the job management service server group 1202 to deliver a regular job until the maximum number of attempts is reached, and deliver a failed job if the maximum number of attempts has been reached.

In FIG. 22, a description is given of the flow where the job management service server group 1202 can deliver a regular job until the maximum number of attempts is reached, and deliver a failed job if the maximum number of attempts has been reached. Further, with reference to FIG. 23, a description is given of the flow where the task server 103 or 104 acquires a job from the job management service server group 1202 and executes processing.

In step 2301, the task server 103 or 104 acquires a job from the job management service server group 1202. In step 2302, the task server 103 or 104 confirms the acquired job. If, however, null is acquired, the task server 103 or 104 determines that a job to be processed is not present. Then, the task server 103 or 104 once ends this flow as it is, and attempts again to acquire a job after a predetermined time period. If the acquired job is a regular job, the processing branches to step 2303. If the acquired job is a failed job, the processing branches to step 2307. In step 2303, the task control unit 1011 calls the regular processing unit 1013 in the task server 103 or 104 and executes regular processing. In step 2304, the task control unit 1011 determines the execution result of the regular processing unit 1013. If the execution result is a success, the processing branches to step 2305. If the execution result is a failure, the processing branches to step 2306.

In step 2305, using the job communication unit 1012, the task control unit 1011 notifies the job management service server group 1202 of the job ID of the job that has been successful and the successful result, as a result report request. In step 2306, using the job communication unit 1012, the task control unit 1011 notifies the job management service server group 1202 of the job ID of the job that has failed and the failed result, as a result report request. That is, the result report request includes a "processing result" indicating a success or a failure. If the acquired job has been a failed job in step 2302, then in step 2307, the task control unit 1011 calls the post-processing unit 1014 and executes post-processing. After the execution of steps 2305, 2306, and 2307, the task server 103 or 104 ends this flow once, and attempts again to acquire a job after a predetermined time period. Thus, the processing flow illustrated in FIG. 23 enables the task server 103 or 104 to call regular processing or post-processing according to the type of the acquired job.

As described above, in the first exemplary embodiment, the following server system is described. That is, if the number of task attempts has not exceeded the maximum number of attempts, a regular job is transmitted to cause tasks to execute a particular process. If the number of task attempts has exceeded the maximum number of attempts, a failed job is transmitted to cause the tasks to execute post-processing corresponding to the particular process. As a result, even if tasks cannot determine how many times a job has been processed, the tasks can execute post-processing at appropriate timing.

In the first exemplary embodiment, if processing has failed as many times as the maximum number of task attempts, the job management service server group 1202 delivers a failed job for post-processing. In a second exemplary embodiment, a description is given of a form in which a failed job is delivered only after all retries including retries of a job have failed. Retries of a job may lead to an improvement in processing continuity such that even if a processing result file of a task cannot be taken out of a temporary file management service server, the processing can be continued. Thus, in the form according to the second exemplary embodiment, an error notification is given after a job has failed. This can improve processing continuity as compared to the form according to the first exemplary embodiment, where an error notification is given after tasks have failed, and this can also limit post-processing to one time.

The temporary file management service server group 1203 includes a plurality of temporary file management services and holds image data input from the scanning service server group 101, as initial data in a multiple manner in the plurality of temporary file management services. For example, the case is considered where there are two temporary file management service servers, namely servers A and B. If the scanning service server group 101 has made a save request to the server A, also the server A makes a save request to the server B. Then, after the saving has been completed in both the servers A and B, the servers A and B return a response to the scanning service server group 101, thereby replicating initial data.

On the other hand, if the processing results of tasks are saved in the temporary file management service server group 1203, the processing results are not held in a multiple manner. That is, a processing result file of the task server 103 is stored in either the server A or B. This is because, since a result file of a task can be generated by re-executing the processing of the task server 103, the result file is not held in a multiple manner to conserve disk capacity. On the other hand, image data obtained by scanning an image is data that cannot be obtained without requesting the data from the user again, and therefore is difficult to acquire. Thus, initial data or data difficult to acquire, such as image data obtained by scanning an image, is held in a multiple manner in the temporary file management service server group 1203.

Figure 18:
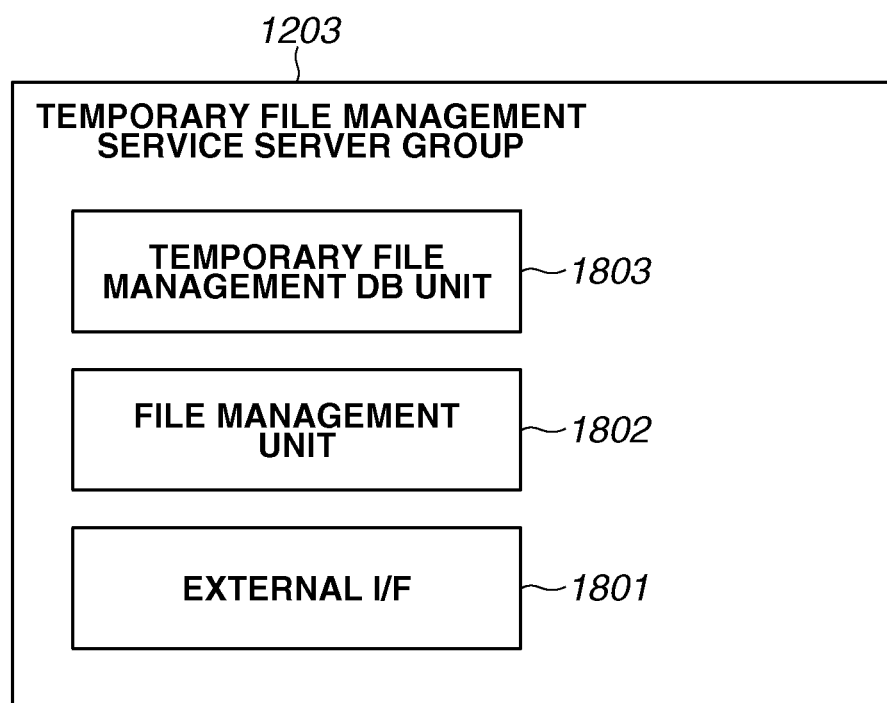
FIG. 18 is a system configuration diagram of a temporary file management service server group according to a second exemplary embodiment of the present invention.

With reference to FIG. 18, the temporary file management service server group 1203 is described. FIG. 18 is a diagram illustrating the system configuration of each of the temporary file management service servers. An external I/F 1801 communicates with the task servers 103 and 104 and the image forming apparatus 107. The task servers 103 and 104 and the image forming apparatus 107 access the functions of the temporary file management service server group 1203 through the external I/F 1801. A file management unit 1802 is an area for saving a file for which a save request has been made. A temporary file management DB unit 1803 is a database for managing location information of the file management unit 1802, and is mirroring-synchronized with the temporary file management service server group 1203. This enables the reading of the same data from any of the temporary file management service servers.

If a save request is received, the external I/F 1801 saves a file in the file management unit 1802 and writes information of the file in the temporary file management DB unit 1803. In the case of an initial file, the external I/F 1801 makes a file save request to another temporary file management server. Conversely, if a file read request is received, the external I/F 1801 searches the temporary file management DB unit 1803 based on the file group ID included in the request, and identifies the file saving location. Based on the identified save location of the file, the external I/F 1801 accesses the file management unit 1802 to acquire the file.

FIG. 19 is an example of temporary management information managed by the temporary file management DB unit 1803. A file group ID 1910 is an ID for uniquely identifying each file group in one job, and an initial file and a result file are assigned the same file group ID. The file group ID 1910 is generated by the external I/F 1801 when an initial file save request has been made. A number (No.) 1911 indicates the sequential number of the task that has generated each file. A number 0 indicates an initial file. A path 1912 represents the file path to the location where the file is saved in the file management unit 1802. A host name 1913 represents a host in which the file is saved. As described above, the configurations of FIGS. 18 and 19 enable the reading of an initial file from the task servers 103 and 104 even if one of the temporary file management service servers has crashed.

If the server A has crashed in the state of FIG. 19, the next task (the task server 104) becomes incapable of accessing, among the files in which the file group IDs 1910 are FG1, the file indicated by No. 1, that is, a result file generated by the first task (the task server 103). Accordingly, a cloud platform, a method of executing a job, and a program according to the second exemplary embodiment provide a mechanism of retrying the processing of a job from the first task. This enables the re-generation of a result file and the completion of the job. Such a retry is referred to as "a retry of a job" to be distinguished from "a retry of a task" in the first exemplary embodiment. According to the first exemplary embodiment, there is no result file in the processing of the task server 104, and therefore, all retries of tasks fail. Then, the post-processing unit 1014 of the task server 104 is executed. In the second exemplary embodiment, however, after all retries of tasks have failed, retries of the job may successfully perform the processing of the job. In this case, the post-processing unit 1014 is not executed. The job management service server group 1202 may execute the flow of delivering a failed job only after all retries including retries of a job have failed. This can suppress the execution of post-processing, and therefore can suppress the execution of superfluous post-processing.

FIG. 20 illustrates an example of a maximum-number-of-route-attempts definition table managed together with the table in FIG. 14 by the route information management DB unit 1301 according to the second exemplary embodiment. A route ID 2001 is an ID for uniquely identifying each route, similarly to the route ID 1401, and is a key to link data in FIG. 14 with data in FIG. 20. The maximum number of job attempts 2002 is a value defining how many retries of a job input based on the corresponding route ID are to be performed.

With reference to FIG. 21, data held in the job information management DB unit 1602 according to the second exemplary embodiment is described. FIG. 21 illustrates a table further including a column for managing the number of job attempts 2101, in addition to the columns of the table in FIG. 17. The number of job attempts 2101 is a value indicating how many retries of a job to be processed have been performed, and is a value to be counted every time the number of task attempts exceeds the maximum number of attempts.

Figure 24:
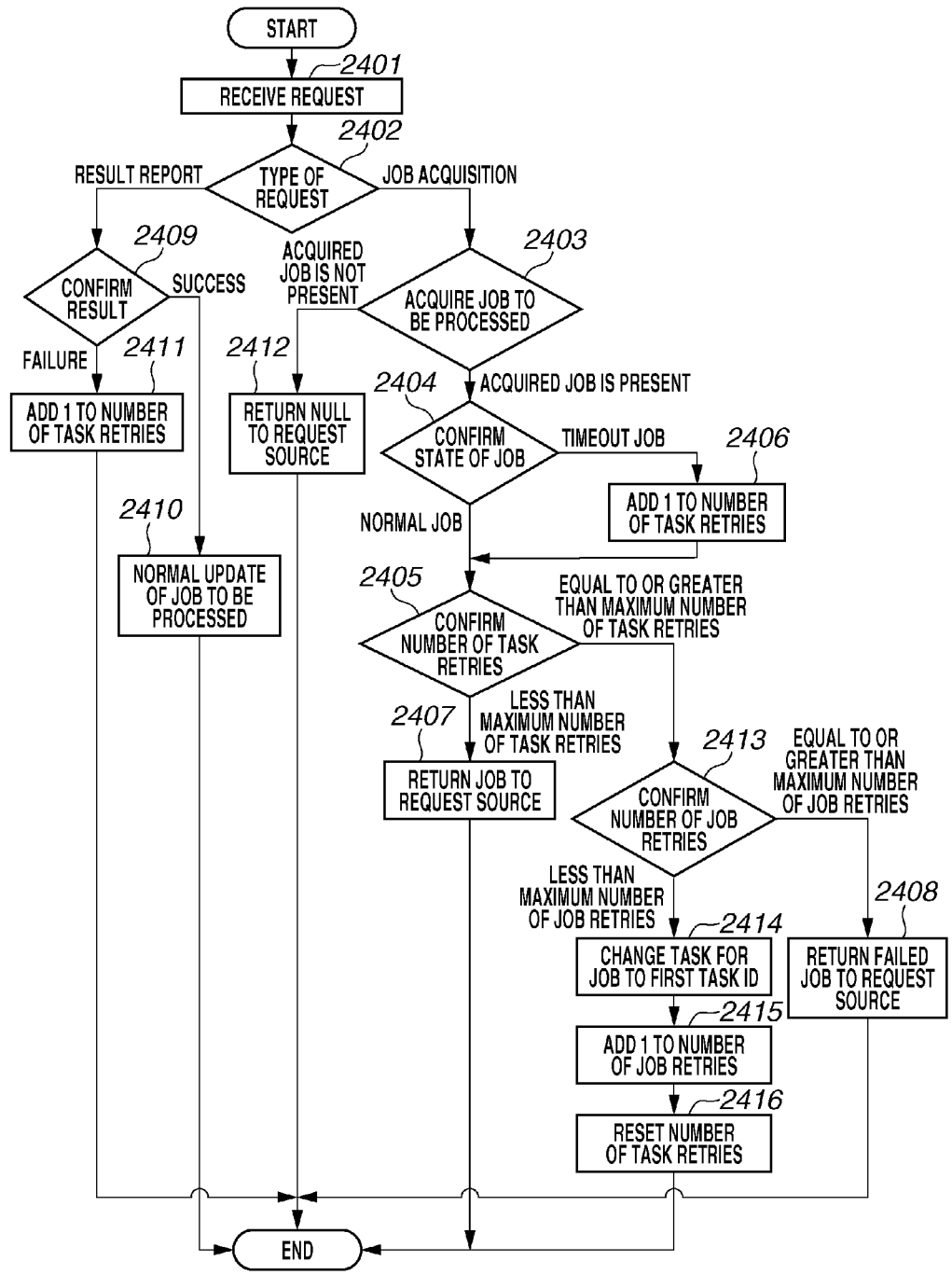
FIG. 24 is a flow chart regarding a task response made by the job management service server group to each of the task servers, according to the first exemplary embodiment of the present invention.

With reference to FIGS. 20, 21, and 24, a description is given below of a response flow when the job management service server group 1202 according to the second exemplary embodiment has received an inquiry about a job from the task server 103 or 104. Steps 2401 to 2412 of FIG. 24 are similar to steps 2201 to 2212 of FIG. 22. In step 2405, the job management service server group 1202 confirms the number of task attempts 1710 of the acquired job. If the number of task attempts 1710 is less than the maximum number of task attempts 1404, step 2407 is executed. If the number of task attempts 1710 is equal to or greater than the maximum number of task attempts 1404, step 2413 is executed. In step 2413, the job management service server group 1202 confirms the number of job attempts 2101. If the number of job attempts 2101 is less than the maximum number of job attempts 2002, step 2414 is executed. If the number of job attempts 2101 is equal to or greater than the maximum number of job attempts 2002, step 2408 is executed.

In step 2414, the job management service server group 1202 makes a request to the route management service server group 1201 and acquires the first task ID of the route ID, thereby updating the current task ID 1704 of the job. In step 2415, to count the number of failures of the processing of the job, the job management service server group 1202 updates the number of job attempts 2101 by adding 1 to the number of job attempts 2101 of the job. In step 2416, the job management service server group 1202 resets the number of task attempts 1710 of the job to 0 and updates the last state notification time 1709 to the current time. Then, the job management service server group 1202 returns null to the request source task, and the job is processed again from the beginning. This results in normally processing a job regarded as an error not due to a task in which an error has occurred but due to a failure of the processing of a task before the task in which the error has occurred, and this also prevents an error notification from being given. Thus, the processing flow illustrated in FIG. 24 enables the job management service server group 1202 to deliver a failed job only if all retries including retries of a job in addition to retries of tasks have failed, or only if a timeout has occurred.

In the second exemplary embodiment, in a cloud system where a retry function delegates a job to another task process, it is possible to execute post-processing only if all retries including retries of a job in addition to retries of tasks have failed, or only if a timeout has occurred. Thus, in the form according to the second exemplary embodiment, an error notification is given after a job has failed. This can improve processing continuity, namely retries of a job, as compared to the form according to the first exemplary embodiment, where an error notification is given after tasks have failed, and this can also limit post-processing to one time.

In the second exemplary embodiment, after retries of tasks and retries of a job have been performed, the job that has failed is subjected to post-processing defined by the task server 103 or 104. Depending on the type of the job that has failed, however, even if an administrator of the image forming apparatus or an administrator of the cloud system is notified of the failure by email or an error log, it may be difficult for the administrator to re-execute the job. Such a job is, for example, a job to be executed by being triggered by an event that is not a user operation, such as a machine event, namely a daily initial start event of an image forming apparatus or an error event, or a schedule execution process at a particular date and time.

A third exemplary embodiment provides a means for resetting the status of the assigned job, the number of job attempts, and the number of task attempts, if a retry has been assigned to a job in which the processing has been suspended due to the fact that the counted number of task attempts has exceeded the maximum number of attempts and also the counted number of job attempts has exceeded the maximum number of attempts.

Figure 25:
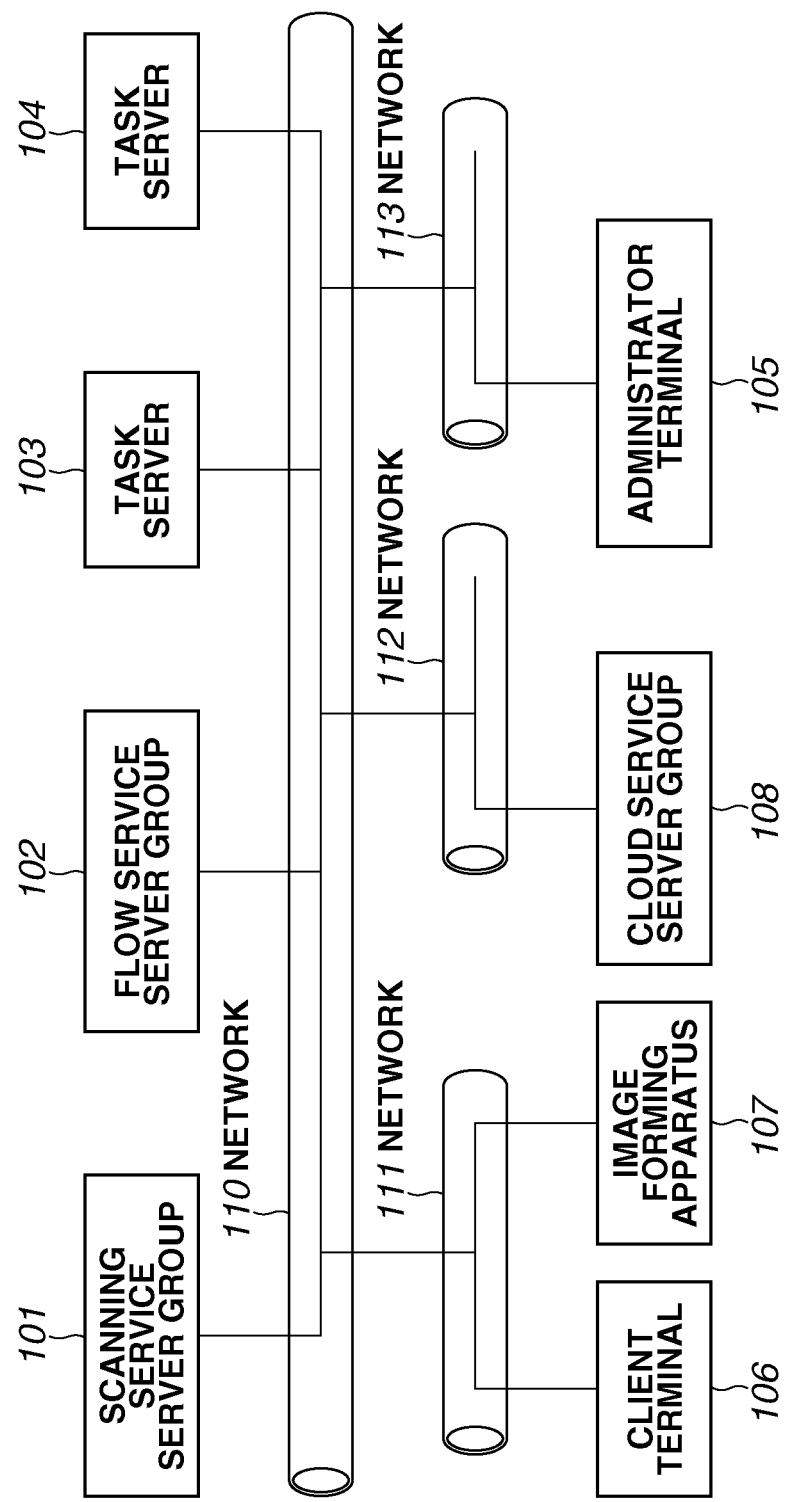
FIG. 25 is a diagram illustrating the overall configuration of a cloud system according to a third exemplary embodiment of the present invention.

FIG. 25 is a diagram illustrating the overall configuration of a cloud system according to the present exemplary embodiment. In addition to the components of FIG. 1, FIG. 25 further includes: an administrator terminal 105, which is used by an administrator of the flow service server group 102; and a communication network 113, which allows the communication between the administrator terminal 105 and the flow service server group 102. A hardware configuration diagram of a server computer that executes the administrator terminal 105 is as illustrated in FIG. 2.

Figure 26:
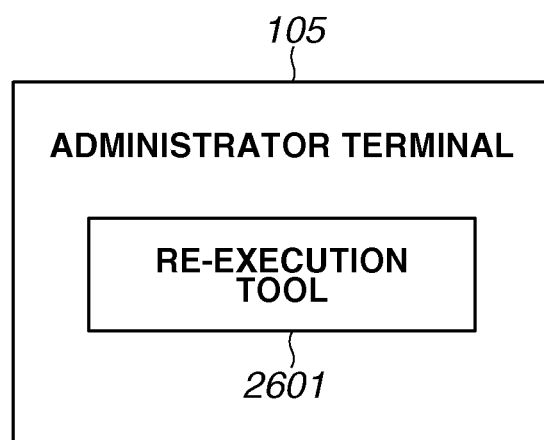
FIG. 26 is a system configuration diagram of an administrator terminal according to the third exemplary embodiment of the present invention.
Figure 27:
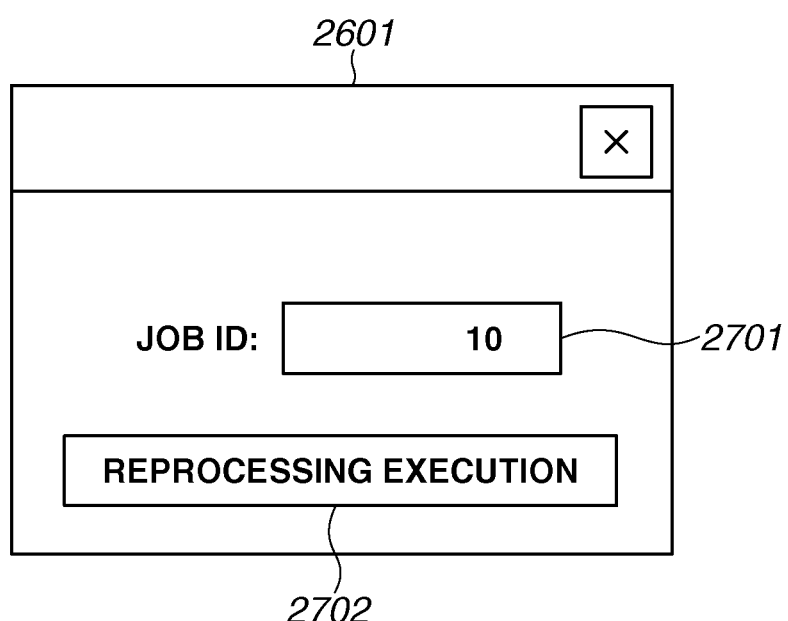
FIG. 27 is an example of a user interface of a re-execution tool according to the third exemplary embodiment of the present invention.

FIG. 26 is a system configuration diagram of the administrator terminal 105. A re-execution tool 2601 is a tool for communicating with the flow service server group 102 to cause the flow service server group 102 to re-execute a specified job. FIG. 27 illustrates a screen of the re-execution tool 2601, on which an administrator of the cloud service specifies a job ID in a job ID specifying unit 2701 and presses a reprocessing execution button 2702. Consequently, the flow illustrated in FIG. 28 is executed.

Figure 28:
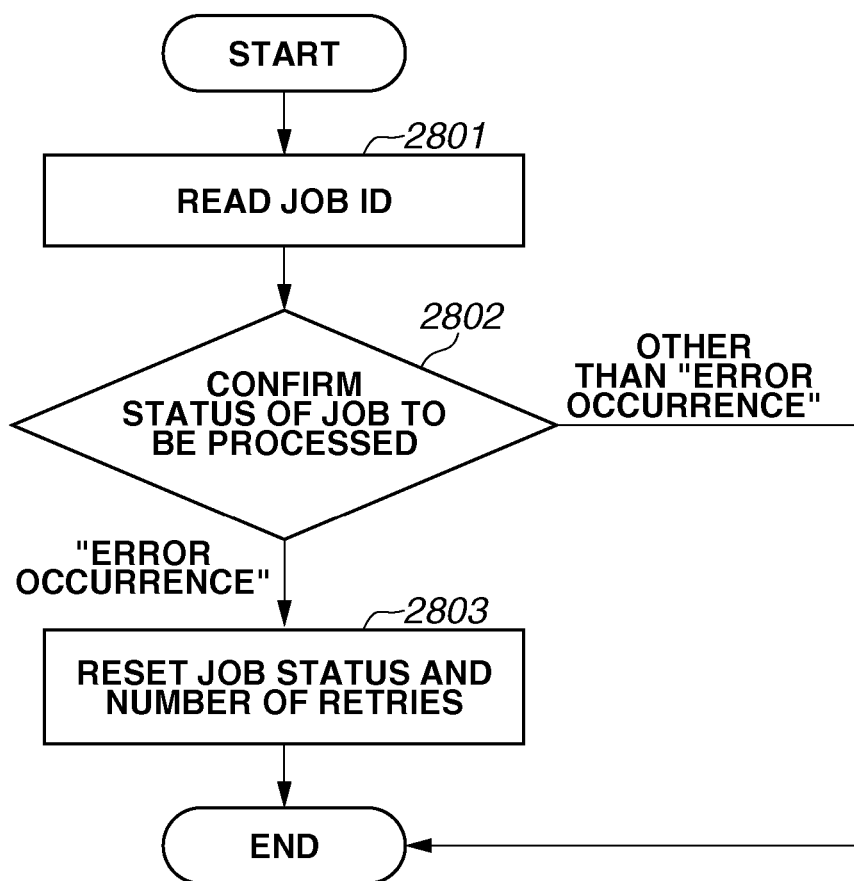
FIG. 28 is a flow chart regarding processing performed by a re-execution tool according to the third exemplary embodiment of the present invention.

FIG. 28 is a diagram illustrating the processing flow of the re-execution tool 2601. In step 2801, the re-execution tool 2601 reads a job ID specified in the job ID specifying unit 2701. In step 2802, the re-execution tool 2601 confirms the status 1705 of the job corresponding to the job ID read in step 2801 in the job management service server group 1202. If the status 1705 confirmed in step 2802 is "error occurrence (2)", step 2803 is executed. If the status 1705 is other than "error occurrence (2)", the flow ends.

In step 2803, the re-execution tool 2601 resets the state of the job corresponding to the job ID read in step 2801. That is, the re-execution tool 2601 resets the number of task attempts 1710 of the job to 0, changes the last state notification time 1709 to the current time, and changes the status 1705 to "waiting for processing (0)". In the serial flow in FIG. 28, the re-execution tool 2601 changes the status 1705 of the record corresponding to the job ID specified in the table in FIG. 21 to "waiting for processing (0)", and changes both the number of task attempts 1710 and the number of job attempts 2101 to 0. If the table in FIG. 21 has been reset, the task server 104 resumes the processing of the job that has been suspended from S1122 in the flow chart of FIG. 11.

As described above, in the third exemplary embodiment, if a system administrator has been notified of the job ID of a job that has failed, the re-execution tool 2601 can make the job that has failed executable again, without causing again an occurrence event of the job to be processed.

OTHER EXEMPLARY EMBODIMENTS

The present invention is achieved also by performing the following process. Software (a computer program) for achieving the functions of the above exemplary embodiments is supplied to a system or an apparatus via a network or various storage media to cause a computer (or a CPU or a microprocessor unit (MPU)) of the system or the apparatus to read and execute the program. In this case, the program and a storage medium storing the program constitute the present invention.

According to the present invention, even if tasks cannot determine how many times a job has been processed, the tasks can execute post-processing at appropriate timing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-077128 filed Apr. 2, 2013, which is hereby incorporated by reference herein in its entirety.

What is claimed is:

1. A server system that can communicate with a plurality of tasks of executing prescribed processes, and causes the plurality of tasks, of which the prescribed processes are different from each other, to sequentially process a job having occurred, thereby achieving processing of the job, the server system comprising:
   a processor; and
   a memory configured to store data to be processed by the processor, and the processor comprising:
   a counting unit configured to count a number of task attempts according to a failure of a particular process executed by each of the tasks; and a job management unit configured to, when the tasks of executing the particular process has made a request to acquire the job, if the number of task attempts counted by the counting unit has not exceeded the maximum number of attempts, transmit a regular job, and if the number of task attempts counted by the counting unit has exceeded the maximum number of attempts, transmit a job for a failure, wherein, if the job management unit has transmitted the regular job, the tasks execute the particular process, and if the job management unit has transmitted the job for a failure, the tasks execute post-processing corresponding to the particular process, wherein the counting unit counts the number of job attempts when the counted number of task attempts has exceeded the maximum number of attempts, and wherein, when the tasks of executing the particular process has made a request to acquire the job, if the number of task attempts counted by the counting unit has exceeded the maximum number of attempts but the number of job attempts has not exceeded the maximum number of attempts, the job management unit performs control to process the job again from a beginning without transmitting the job for a failure.

2. The server system according to claim 1, wherein, if the number of task attempts counted by the counting unit has exceeded the maximum number of attempts and also the number of job attempts has exceeded the maximum number of attempts, the job management unit transmits the job for a failure.

3. The server system according to claim 1, wherein, if a retry has been assigned to a job of which processing has been suspended since the number of task attempts counted by the counting unit has exceeded the maximum number of attempts and also the number of job attempts has exceeded the maximum number of attempts, the job management unit resets the number of job attempts and the number of task attempts and performs control to process the job again from a beginning.

4. The server system according to claim 1, wherein the post-processing is at least one of a process of outputting an error log, a process of giving a notification as an error email, and a status display process for displaying an error status.

5. The server system according to claim 1, wherein the job is a job of performing image processing on image data generated by scanning an image in an image forming apparatus, and of executing a transmission process for transmitting the image data subjected to the image processing to an external server system.

6. The server system according to claim 1, wherein the particular process is at least one of image processing to be performed on image data generated by scanning an image in an image forming apparatus, and a transmission process for transmitting the image data subjected to the image processing to an external server system.

7. A control method for controlling a server system that can communicate with a plurality of tasks of executing prescribed processes, and causes the plurality of tasks, of which the prescribed processes are different from each other, to sequentially process a job having occurred, thereby achieving processing of the job, wherein a counting unit counts a number of task attempts according to a failure of a particular process executed by each of the tasks, wherein a job management unit, when the tasks of executing the particular process has made a request to acquire the job, if the number of task attempts counted by the counting unit has not exceeded the maximum number of attempts, transmits a regular job, and if the number of task attempts counted by the counting unit has exceeded the maximum number of attempts, transmits a job for a failure, wherein, if the job management unit has transmitted the regular job, the tasks execute the particular process, and if the job management unit has transmitted the job for a failure, the tasks execute post-processing corresponding to the particular process, and wherein the counting unit counts the number of job attempts when the counted number of task attempts has exceeded the maximum number of attempts, and wherein, when the tasks of executing the particular process has made a request to acquire the job, if the number of task attempts counted by the counting unit has exceeded the maximum number of attempts but the number of job attempts has not exceeded the maximum number of attempts, the job management unit performs control to process the job again from a beginning without transmitting the job for a failure.

8. The control method according to claim 7, wherein, if the number of task attempts counted by the counting unit has exceeded the maximum number of attempts and also the number of job attempts has exceeded the maximum number of attempts, the job management unit transmits the job for a failure.

9. The control method according to claim 7, wherein, if a retry has been assigned to a job of which processing has been suspended since the number of task attempts counted by the counting unit has exceeded the maximum number of attempts and also the number of job attempts has exceeded the maximum number of attempts, the job management unit resets the number of job attempts and the number of task attempts and performs control to process the job again from a beginning.

10. The control method according to claim 7, wherein the post-processing is at least one of a process of outputting an error log, a process of giving a notification as an error email, and a status display process for displaying an error status.

11. The control method according to claim 7, wherein the job is a job of performing image processing on image data generated by scanning an image in an image forming apparatus, and of executing a transmission process for transmitting the image data subjected to the image processing to an external server system.

12. The control method according to claim 7, wherein the particular process is at least one of image processing to be performed on image data generated by scanning an image in the image forming apparatus, and a transmission process for transmitting the image data subjected to the image processing to an external server system.

13. A non-transitory computer-readable storage medium storing a computer program for causing a server system to execute the control method according to claim 7.

* * * * *